United States Patent [19]

Warren et al.

[11] Patent Number: 5,600,233

[45] Date of Patent: Feb. 4, 1997

[54] ELECTRONIC POWER CONTROL CIRCUIT

[75] Inventors: Rufus W. Warren, Oak Lawn; John E. Gorman, Cicero, both of Ill.

[73] Assignee: Chicago Stage Equipment Co., Oak Lawn, Ill.

[21] Appl. No.: 518,107

[22] Filed: Aug. 22, 1995

[51] Int. Cl.⁶ .................................. G05F 1/10; H02J 3/12
[52] U.S. Cl. ......................... 323/237; 323/246; 323/905
[58] Field of Search ................................ 323/237, 246, 323/905; 315/297, 307

[56] References Cited

U.S. PATENT DOCUMENTS

| | | | |
|---|---|---|---|
| 4,528,494 | 7/1985 | Bloomer | 323/237 |
| 4,949,020 | 8/1990 | Warren et al. | 315/297 |
| 4,975,629 | 12/1990 | Callahan et al. | 323/235 |
| 5,072,170 | 12/1991 | Crane et al. | 323/237 |
| 5,239,255 | 8/1993 | Schanin et al. | 323/237 |
| 5,268,631 | 12/1993 | Gorman et al. | 323/246 |
| 5,319,301 | 6/1994 | Callahan et al. | 323/235 |
| 5,331,270 | 7/1994 | Nutz et al. | 323/237 |

*Primary Examiner*—Stuart N. Hecker
*Attorney, Agent, or Firm*—Roger J. French

[57] ABSTRACT

An improved method and apparatus for handling the large load currents which occur with overloads, short circuits, and momentary overcurrents such as in starting motors or cold incandescent lamp filaments. The method involves turning the load current off when an overcurrent is detected, and then back on again before the end of the half-cycle in which the overcurrent occurred. This allows more current to flow during the half-cycle without the need to increase the peak current capability of the power-handling components. With an incandescent lamp load, this results in more rapid lamp brightening without the need for larger, more expensive components. Several embodiments are disclosed which respond to different features of the power line voltage cycle, including a very low-cost microprocessor circuit and power supply.

20 Claims, 21 Drawing Sheets

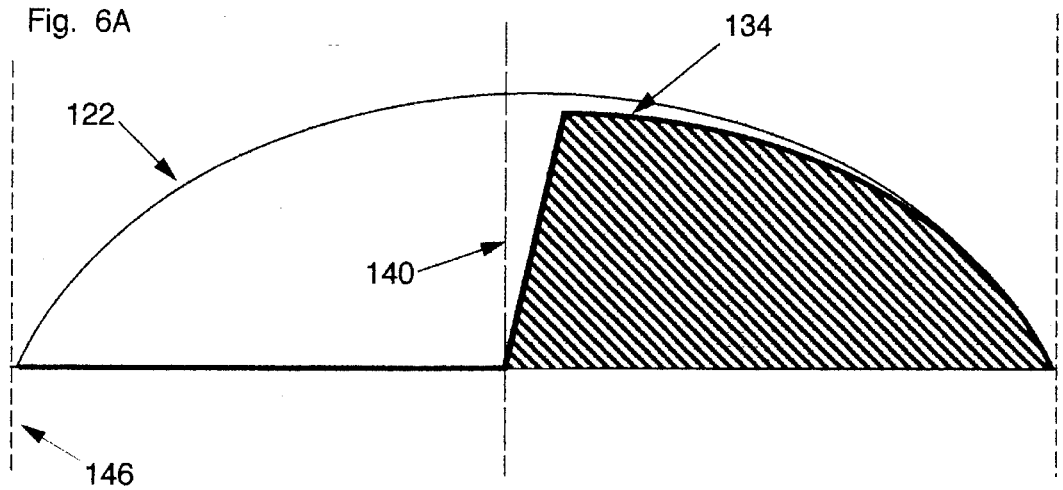
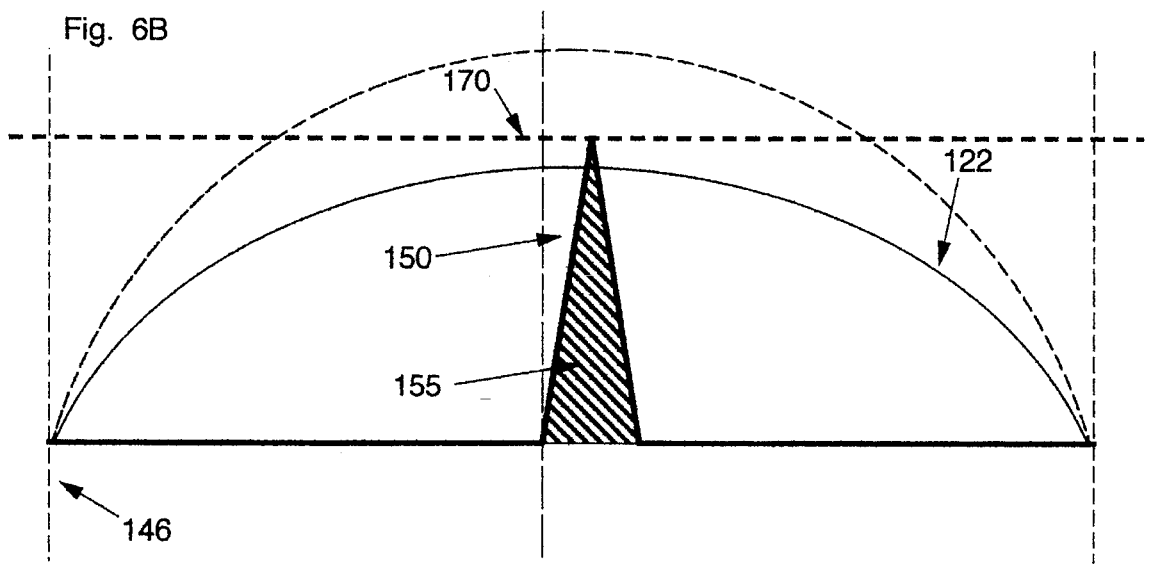

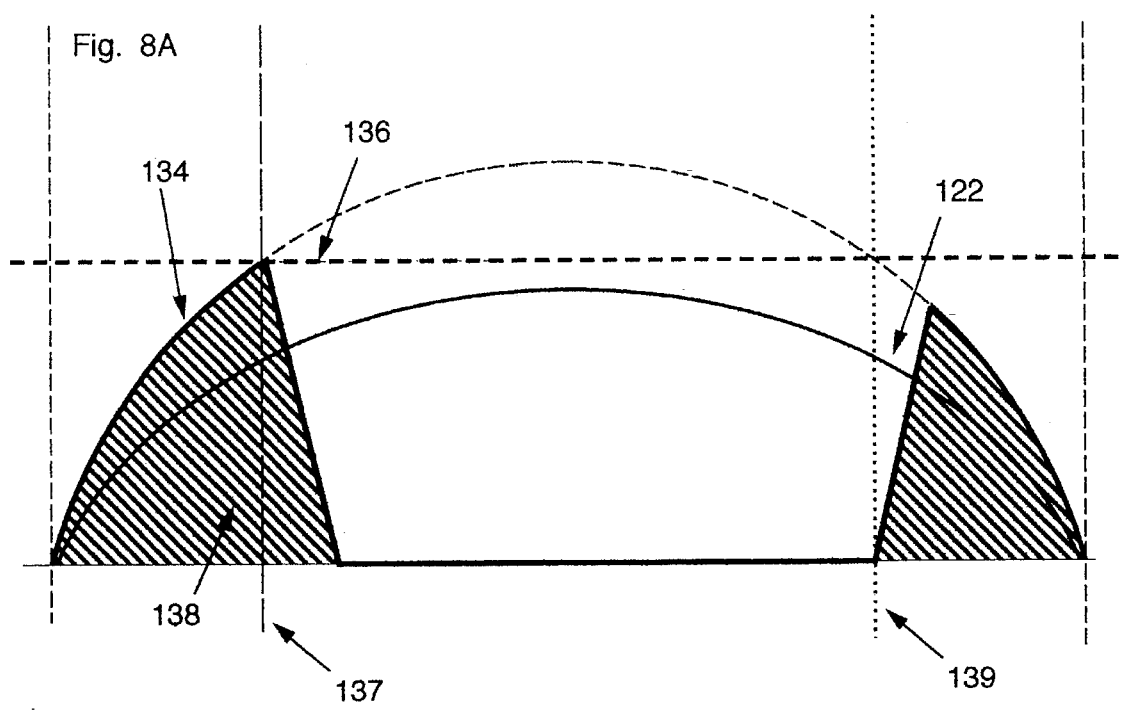
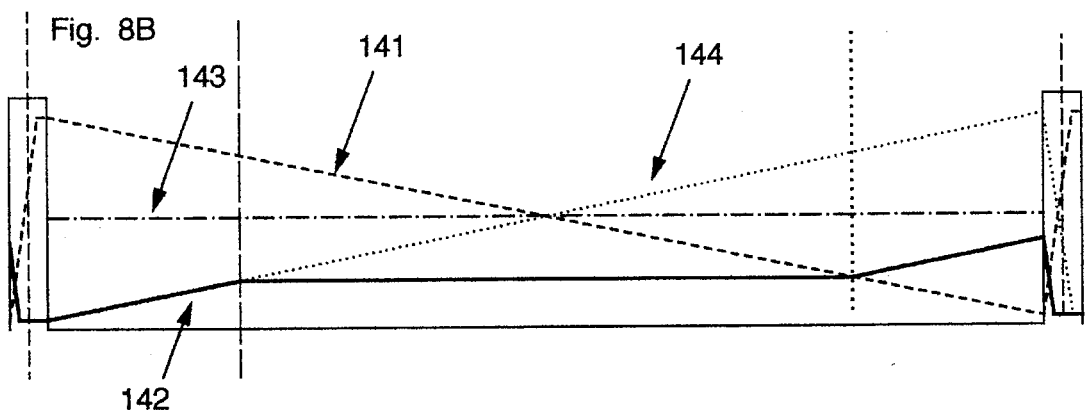

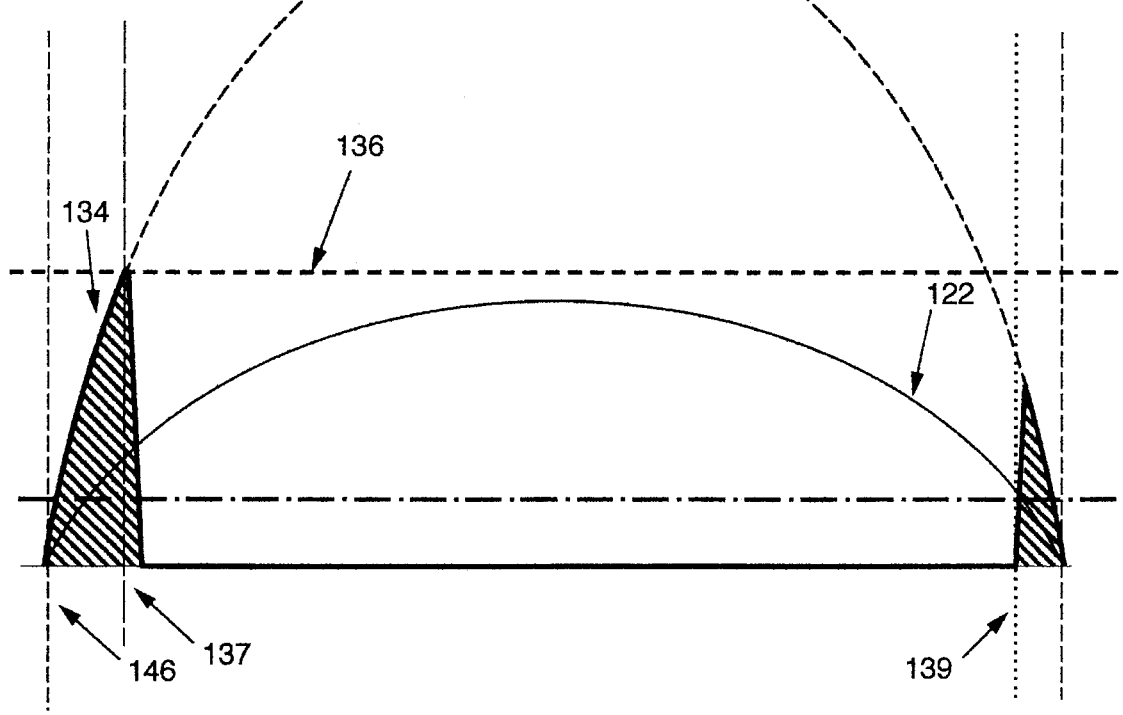

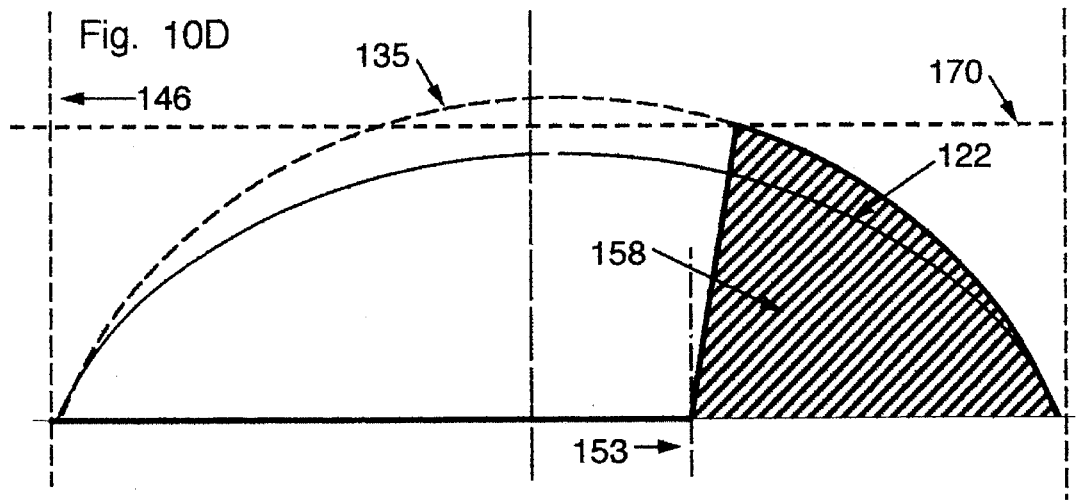
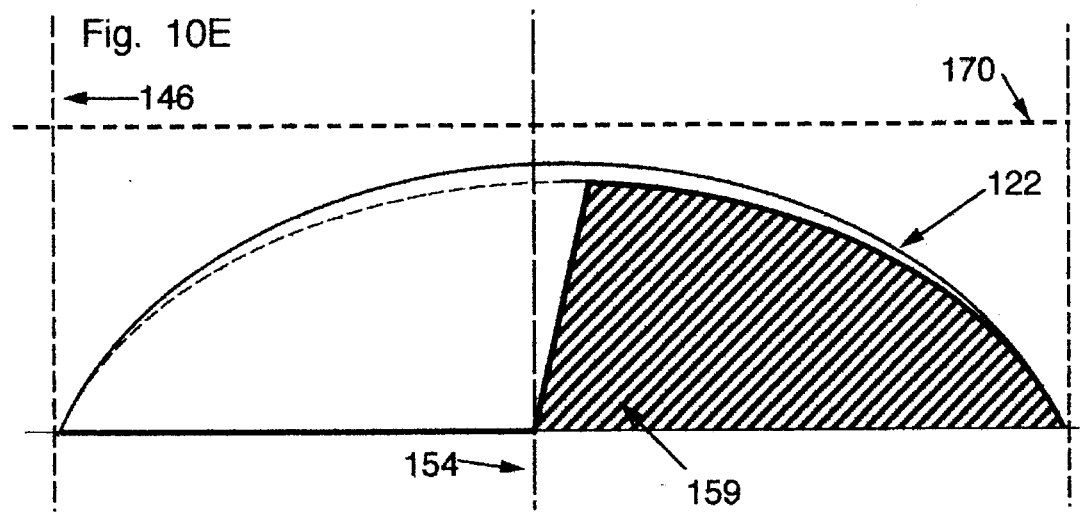

ELECTRONIC POWER CONTROL CIRCUIT

BACKGROUND OF THE INVENTION

Many electrical and electronic products require more current input when starting or when increasing load levels than while running with a steady load. Notable among such devices are incandescent lamps and motors. Incandescent lamps have changed life in innumerable ways during the century since their introduction despite their many shortcomings, such as inefficiency, fragility, and filament noise. Also, the tungsten filaments in general use have less resistance when cold than when warm. This causes a cold lamp to draw more current than a warm one (sometimes more than 10 times as much). In high power dimmers, cold lamp filaments may behave little differently from a short circuit.

The lighting industry has dealt with the situation in many ways, such as specifying circuit breakers with a time delay before tripping to allow lamps to warm up, or, in the case of dimmers, applying a small amount of voltage to the lamp to keep the filament warm without giving off a significant amount of light. Incandescent lamp dimmers typically use components with surge current ratings many times their steady state ratings. Thyristors, such as triacs or SCRs (silicon controlled rectifiers), are built with this type of surge current capability. However, they have several drawbacks which have been accepted by the lighting industry as inevitable concomitants: they turn on abruptly, and they cannot be turned off once they start to conduct. The abrupt turn-on causes EMI (electromagnetic interference) and acoustical noise in lamps, connectors and wiring. These problems are reduced by using a series choke to limit the rate of current rise; however, for large currents this choke becomes large, heavy and expensive. The inability to turn off current becomes a problem if an overload or short circuit occurs at the dimmer output. The device must conduct whatever current the power line is capable of delivering until the circuit breaker (or fuse) opens, or until the load current drops to zero at the end of the half-cycle in which the short occurs. High quality dimmers use thyristors rated to handle these very large surge currents; such devices are understandably expensive.

Dimmers which use transistors rather than thyristors and chokes to control current flow to lamp or motor loads manage the current surge and overload situation differently. Transistors do not, in general, have the surge current ratings to handle a cold lamp load of the full nominal dimmer rating, let alone the current of a short circuit. Transistor dimmers rely on current sensing to detect potentially damaging currents, and turn off or limit current to prevent damage.

This is adequate for handling short circuits; all that is usually required is that the dimmer suffer no damage. However, when cold lamp filaments are the cause of a current surge, current limiting causes a slowdown in the warming of the filament and a delay in brightening the lamp. In many cases this is undesirable or even unacceptable performance. In some transistor dimmers, the practice has been to shut off current very soon after an overcurrent is detected, keep the current off for the remainder of the half-cycle in which the overcurrent occurs, and restart the current in the next half-cycle. If the load is a lamp, the filament warming which occurs in each half-cycle causes higher load resistance, and thus lower peak current to flow in each succeeding half-cycle. This type of current limiting may result in a very low duty cycle in the case of a large cold lamp load, and thus a long time may pass before enough filament warming occurs to allow full current flow without momentary overcurrents.

The previous discussion applies both to reverse phase control and forward phase control. However, in reverse phase control the load current is switched on at or near the zero-cross point, and thus starts very low and increases as the instantaneous line voltage increases. Power is delivered until the necessary cutoff time for the desired output voltage. If a large, cold incandescent load is present, overcurrent may occur an appreciable time after current begins to flow. If the current is shut off at this time, enough power may have been delivered to the lamp filament load to warm it significantly.

In contrast, in forward phase control the load current is often switched on while the instantaneous line voltage is already relatively high. If a large, cold incandescent lamp load is present, overcurrent usually occurs a relatively short time after current begins to flow. The current cutoff at this time results in a low duty cycle and little output power. In this condition, lamp filaments will not warm up quickly and a long time will elapse until the lamp warms enough for normal operation. If the load is near the dimmer's maximum rating, and the current switch-on time is near the line voltage maximum, the filaments may never get warm enough to allow the lamp to light as desired.

Some prior art dimmers have used microprocessors with internal or external A/D convertors, which require repeated readings to determine whether an overcurrent has occurred. This may require prohibitively expensive A/D converters, if continuous overcurrent detection is required. Microprocessors allow sophisticated control functions, but are subject to more stringent power supply requirements than analog circuits and can be relatively expensive to implement. Also, relatively sophisticated and expensive microprocessors have been required to achieve smooth transitions in lamp brightness.

OBJECTS AND SUMMARY OF THE INVENTION

It is an object of the present invention to manage overcurrent situations better by turning the load current off when overcurrent is detected, and then on again before the end of the half-cycle in which the overcurrent occurred, even though this goes against conventional wisdom.

The various embodiments of the invention described hereinbelow employ different methods to select current restart points where the line voltage is low enough that excessive amounts of current cannot flow. This will increase the duty cycle without increasing the level of peak current flow, allowing lamp loads to brighten faster without the need for larger, more expensive power control semiconductors. This method works in both forward and reverse phase control, and with both choke-type and chokeless dimmers.

In one embodiment of the invention, forward phase control overcurrent response benefits from moving the switch-on time later in the half-cycle, to a point where current flow is acceptably low, and then moving it earlier and earlier in subsequent half-cycles until the output voltage is at the level set by the controller. We have found that a low-cost interrupt-driven microprocessor with an improved power supply can perform these functions with greater sophistication than analog circuits, without a large cost penalty.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description, taken in connection with the accompanying drawings in which like reference numerals identify like elements, and in which:

FIG. 6A and 6B illustrate a pair of waveform diagrams showing forward phase control, in normal operation, and prior art response to an overcurrent;

FIG. 8A and 8B illustrate a waveform diagram showing overcurrent response and current restart based on the time elapsed between zero-cross and overcurrent;

FIG. 9 is a waveform diagram showing overcurrent response and current restart based on a sample of the line voltage;

FIG. 10A through 10E illustrate a series of waveform diagrams showing the effect of moving the switch-on time in forward phase control in response to an overcurrent;

DETAILED DESCRIPTION OF THE ILLUSTRATED EMBODIMENT

Figure 1:
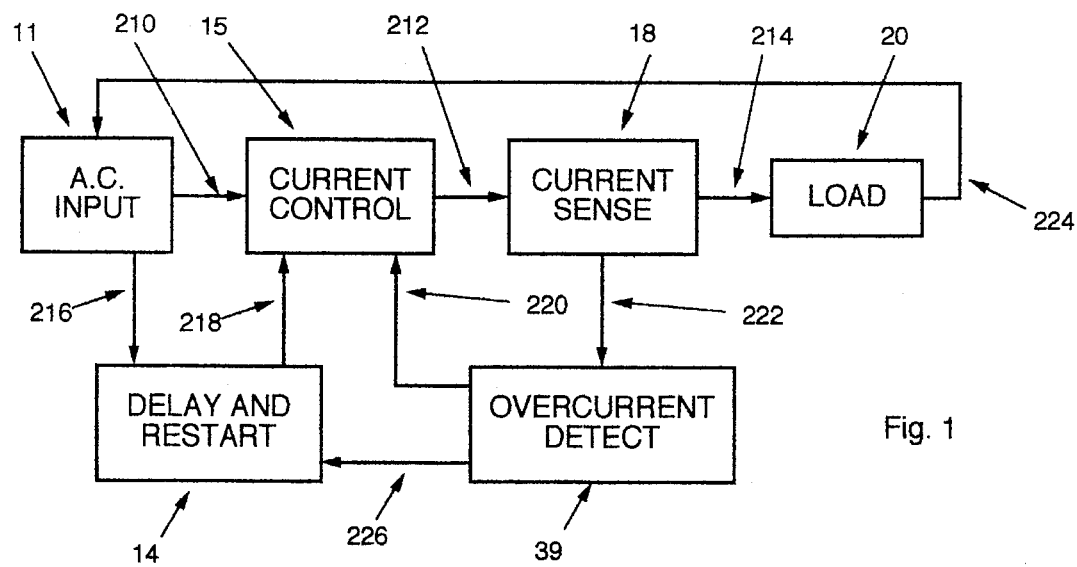
FIG. 1 is a block diagram of the invention in a form generic to the various embodiments.
Figure 2:
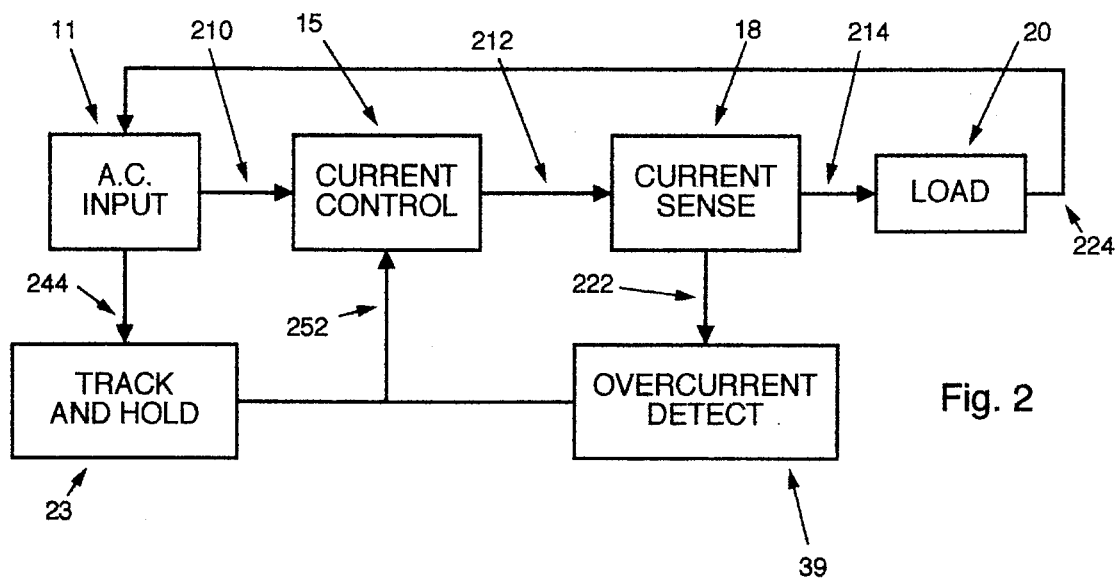
FIG. 2 is a block diagram of a first embodiment of the invention.
Figure 3:
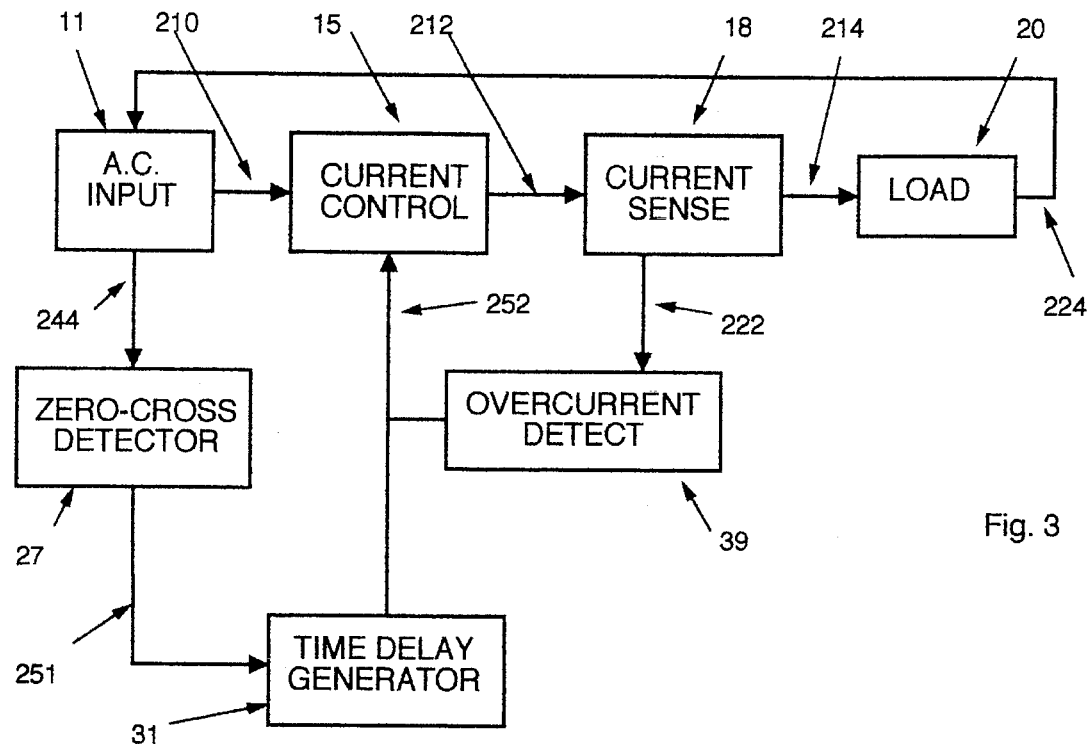
FIG. 3 is a block diagram of a second embodiment, in which current restart is based on the time elapsed between zero-cross and overcurrent.

The first embodiment of a current restart method disclosed herein (see FIGS. 2, 7, 11 and 15) detects an overcurrent event, memorizes the instantaneous line voltage at that time, and prevents load current flow until the instantaneous line voltage drops below the level at which the overcurrent occurred. The phase control timing circuit 2 in current control circuit 15 turns on the diode in optical isolator 370 near the zero-cross time 146, which pulls the voltage at the negative input of comparator 374 to a voltage lower than the normally high logic voltage level of current enable signal 252. This causes the output of comparator 374 to swing high, turning on load power switch 377. This allows load current to flow, and buffer 388 in current sense circuit 18 amplifies the resulting voltage drop across resistor 378. If the output 134 of amplifier 388 rises higher than the threshold voltage 136 at time 137, the output of comparator 386 swings high, turning on transistor 390 and pulling current enable signal 252 low, turning off comparator 374 and switch 377, thus shutting off load current. The low voltage of current enable signal 252 also switches the track/hold circuit 23 from tracking mode to hold mode by turning off bilateral switch 500. The track/hold circuit 23 then holds the line voltage sample 130 on capacitor 502.

The held voltage sample 130 is compared to the instantaneous line voltage sample 123 in comparator 504, which keeps the current control 15 turned off until the instantaneous voltage sample 123 decreases below the level 130 at which the overcurrent occurred. The output of comparator 504 swings high at this time 139, pulling current enable signal 252 high, so current control 15 is turned on again, and continues to the end of the half-cycle.

The line voltage sample 244 is also connected to the negative input of comparator 510, and to the RC network 506, 508, which act to provide a slightly time-delayed version of the line voltage sample 244 to the positive input of comparator 510, so the output 270 of comparator 510 will be low while the instantaneous line voltage is rising and high while the instantaneous line voltage is falling. This prevents the current restart from occurring if the overcurrent takes place during the second half of the power line half-cycle. An overcurrent which occurs after the time of maximum instantaneous line voltage would not be due to cold lamp filaments, but to a rapid decrease in load resistance, such as a short circuit, or a large load suddenly applied.

Another embodiment (see FIGS. 3, 8A, 8B, 12 and 15), which relies on the time symmetry of the line voltage sine wave instead of sampling the line voltage directly, uses a zero-cross detector 27 connected to the power line voltage 21 to control a time-delay generator 31. The time-delay circuit 31 is activated by a signal from the overcurrent detector 39 to produce a current hold-off signal inversely proportional to the length of time between the zero-cross 146 and the overcurrent 137, so the earlier the overcurrent occurs in a half-cycle, the longer the current will be kept off before being restarted in the same half-cycle.

The zero-cross signal 251 is connected to two ramp generators in the time delay circuit 31. The zero-cross signal 245, which is high near the zero-cross time, causes the output 141 of ramp generator 422 to rise and remain near the positive supply rail as long as the zero-cross signal 145 is high. When the zero-cross signal falls, the output 141 of ramp generator 422 decreases in a linear manner until the next zero-cross time. The zero-cross signal 251 also connects to the ramp generator 404. When the zero-cross signal 145 is high, near the zero-cross time, the output 142 of the ramp generator 404 is held low. When the voltage 145 drops, the output of ramp generator 404 rises in a linear manner, generating a positive-going linear ramp voltage 142. If an overcurrent occurs at time 137, the signal 252 from the overcurrent detector 39 goes low, turning off the bilateral switch 396 and stopping the rise of the ramp voltage 142.

The decreasing ramp voltage 141 continues to fall until it crosses the held ramp voltage 266. At this time 139, the output of comparator 412 rises and pulls up the overcurrent signal 252. This allows the current control circuit 15 to restart. The sooner the overcurrent occurs in the half-cycle, the lower the held ramp voltage 142, and the longer the time required before the decreasing ramp voltage 141 crosses the held ramp voltage 142 and the load current is restarted. Resistors 428 and 430 connect a threshold level 143 of half the maximum possible voltage on rising ramp 144 to the negative input of comparator 432. If an overcurrent occurs during the first half of the power line half-cycle, the rising ramp voltage 142 will stop rising while still below the threshold voltage 143, and will not resume its rise until current restart occurs. If no overcurrent takes place during the first half of the power line half-cycle, the rising ramp 144 will continue to rise and the output of comparator 432 will drop during the second half of the power line half-cycle. This opens bilateral switch 438 and prevents the current restart from occurring if the overcurrent takes place during the second half of the power line half-cycle. An overcurrent which occurs during the second half of the power line half-cycle (after the time of maximum instantaneous line voltage) would not be due to cold lamp filaments, but to a rapid decrease in load resistance, such as a short circuit, or a large load suddenly applied.

Figure 4:
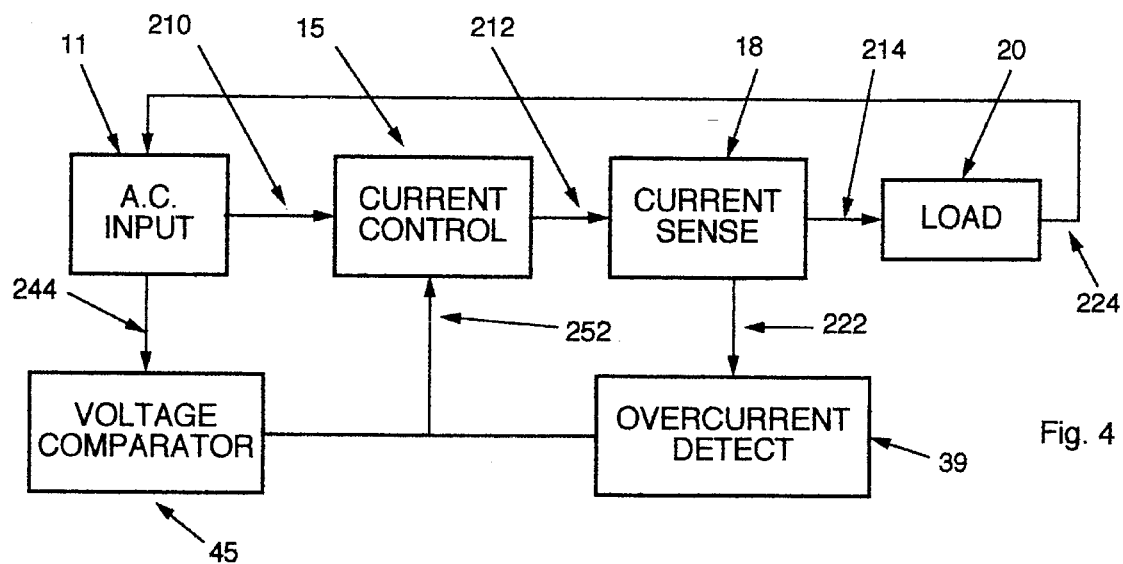
FIG. 4 is a block diagram of a third embodiment, in which current restart is based on line voltage.

A simpler embodiment (see FIG. 4) uses an overcurrent detector 39 which receives a signal from the current sense 18 to turn off the current control 15 in the event of excess current flow. The current remains off until the line voltage, as sampled 244 to a comparator 45, falls low enough that no excess current can flow after current restart, regardless of the load impedance. Even in this case, significant current flows after the current is restarted, providing much of the benefit of current restart with a smaller circuit and fewer components.

This embodiment is especially useful in conjunction (see FIGS. 22, 9, 13 and 15) with a circuit 41 which shuts off the load current very quickly in the event of extreme overcurrent, such as a short circuit. The load current will increase in this event, even though the transition from on to off has begun, so the transition time must be shortened to prevent the load current rising to damaging levels. This type of overload can occur at any time, even in the middle of a half-cycle, so the relationship between current and voltage, or between current and time, cannot be assumed to be the same after the overload occurs as it was before. However, because such an overcurrent may be a momentary occurrence, resumption of normal operation can advantageously be attempted as soon as possible, without waiting for the end of the half-cycle in which the overcurrent occurs.

Figure 13:
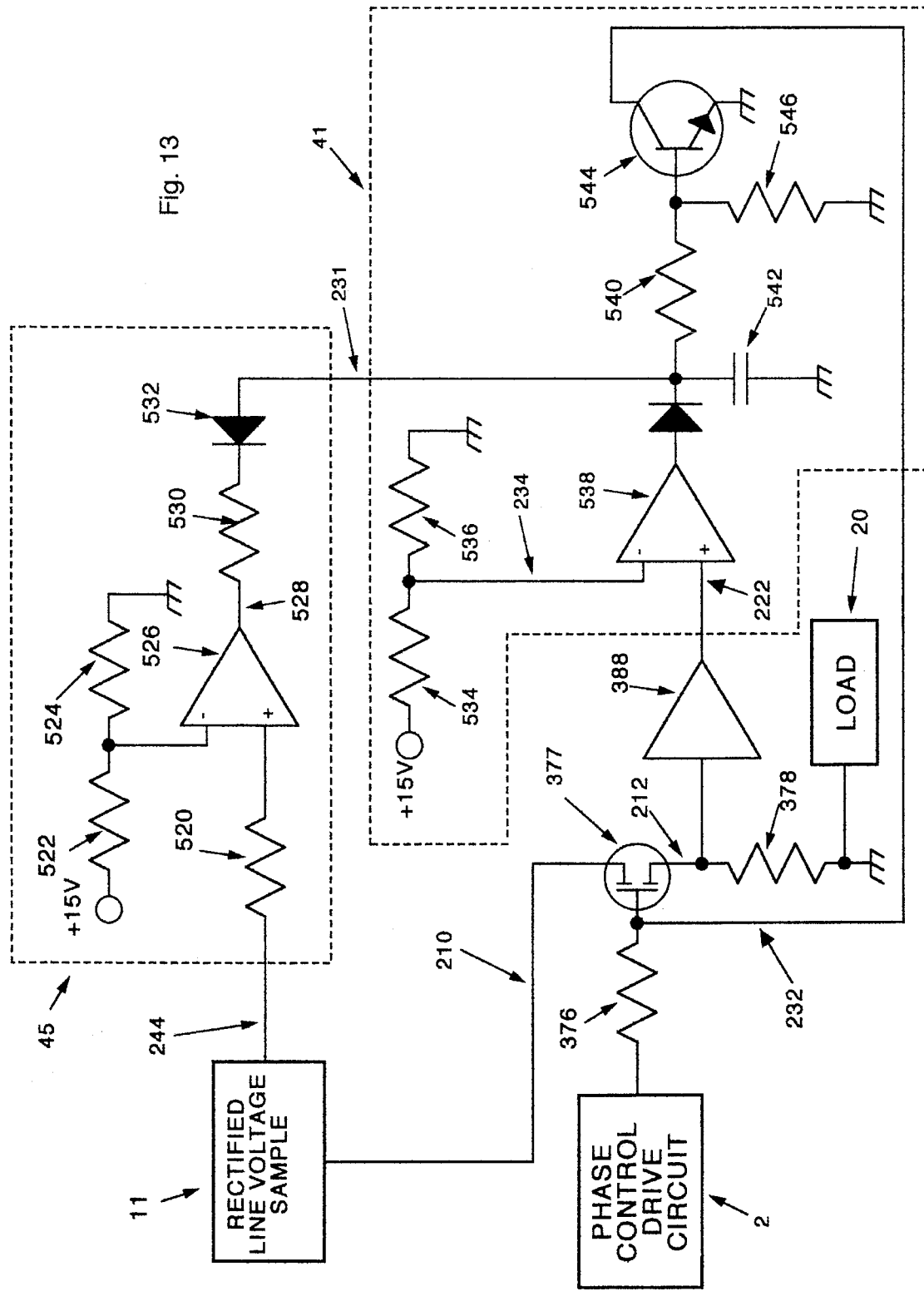
FIG. 13 is a circuit schematic of a line voltage sample current restart section.

FIG. 13 is a diagram of such a quick shutoff and voltage-based restart circuit, with waveforms shown in FIG. 9. The load current signal 134 at the output of amplifier 388 is connected to the positive input of comparator 538. The negative input of comparator 538 is a threshold voltage 136 set by resistors 534, 536 to correspond to a current approaching the damage threshold of the power switch 377. If the voltage 134 representing the current exceeds the cutoff threshold, the output of comparator 538 goes high, charging capacitor 542 and turning on transistor 544, which pulls the power switch gate voltage 232 quickly to zero, turning off the current very quickly at time 137. When the current drops, the current signal 222 no longer exceeds the threshold voltage 234, so the output of comparator 538 drops. Capacitor 542 remains charged, keeping transistor 544 in conduction and gate voltage 232 low so current does not restart. A line voltage sample 244 is connected to comparator 526, such that when the line voltage drops to a level low enough at time 139 that damaging current cannot flow, even if the load is a short circuit, the output of comparator 526 goes low, discharging capacitor 542 and allowing current to restart.

The previous embodiments can be used in either forward or reverse phase control, but the following describes an overcurrent response circuit which is especially useful in forward phase control.

Figure 5A:
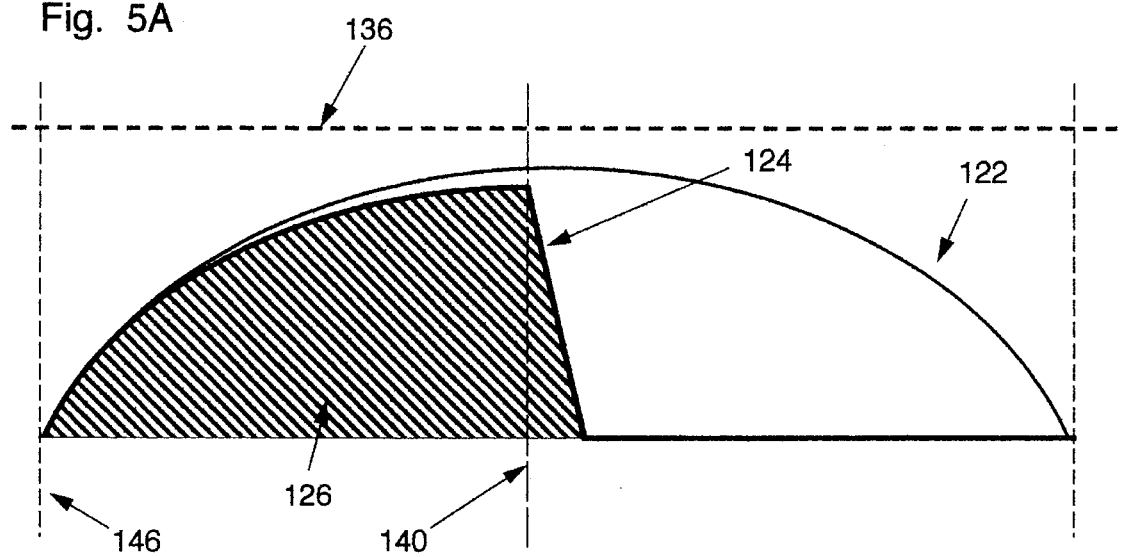
FIG. 5A and 5B illustrate a pair of waveform diagrams showing reverse phase control, in normal operation, and prior art response to an overcurrent.
Figure 5B:
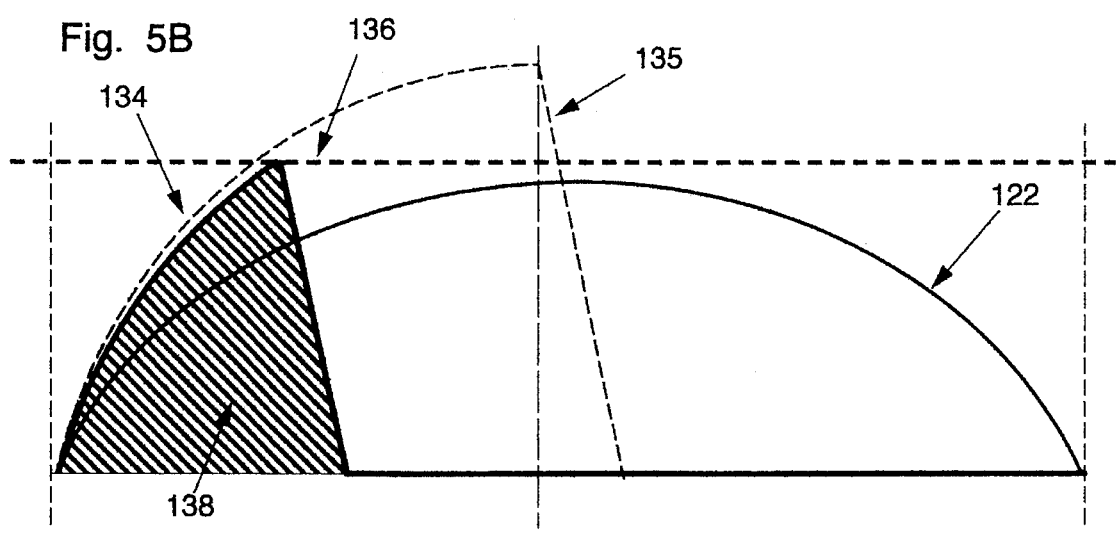
Figure 7:
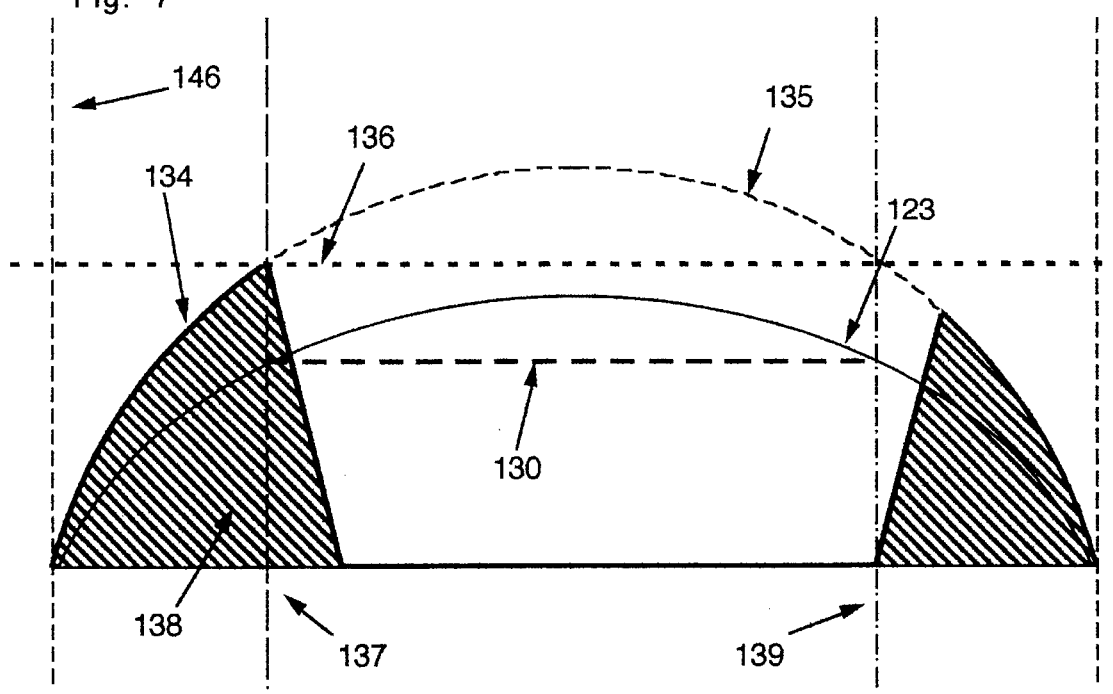
FIG. 7 is a waveform diagram showing overcurrent response and current restart based on a tracked and held sample of the line voltage.
Figure 10A:
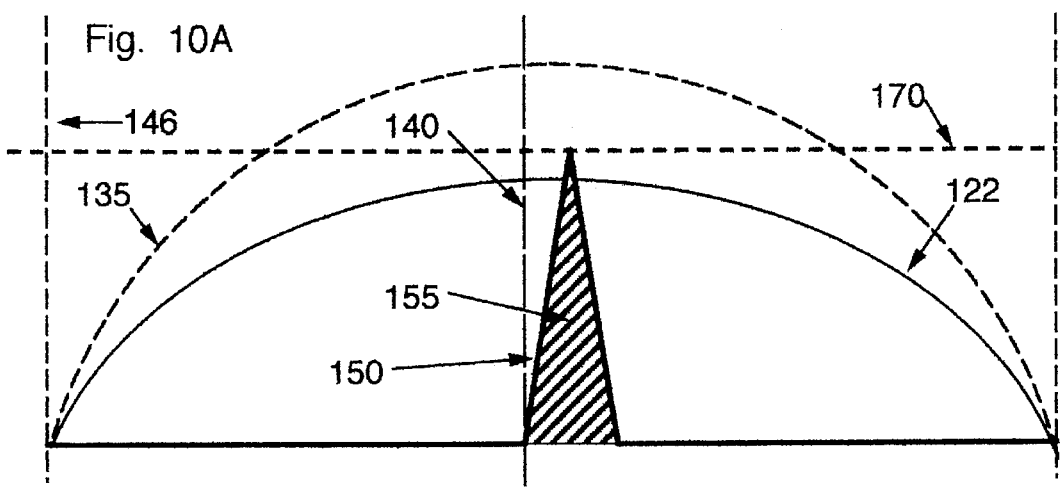
Figure 10B:
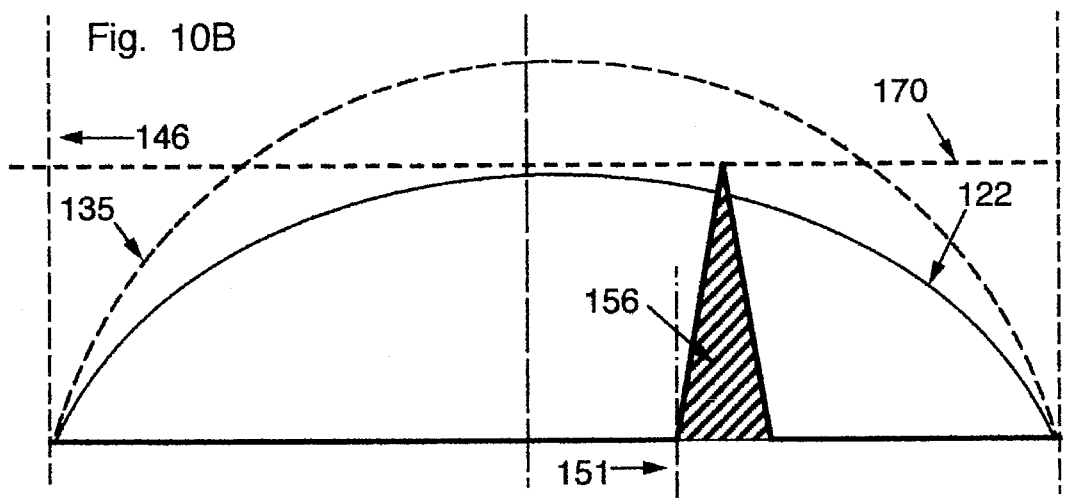
Figure 10C:
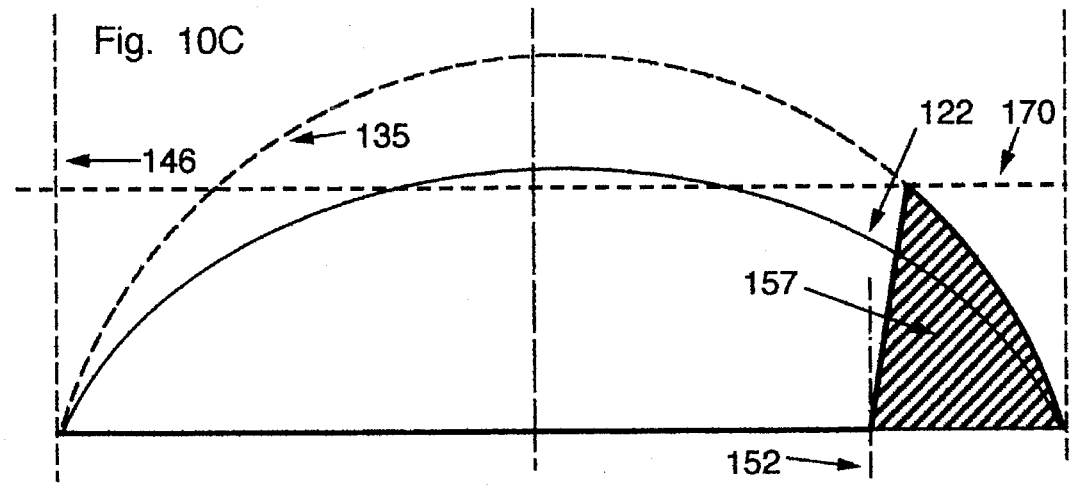
Figure 11:
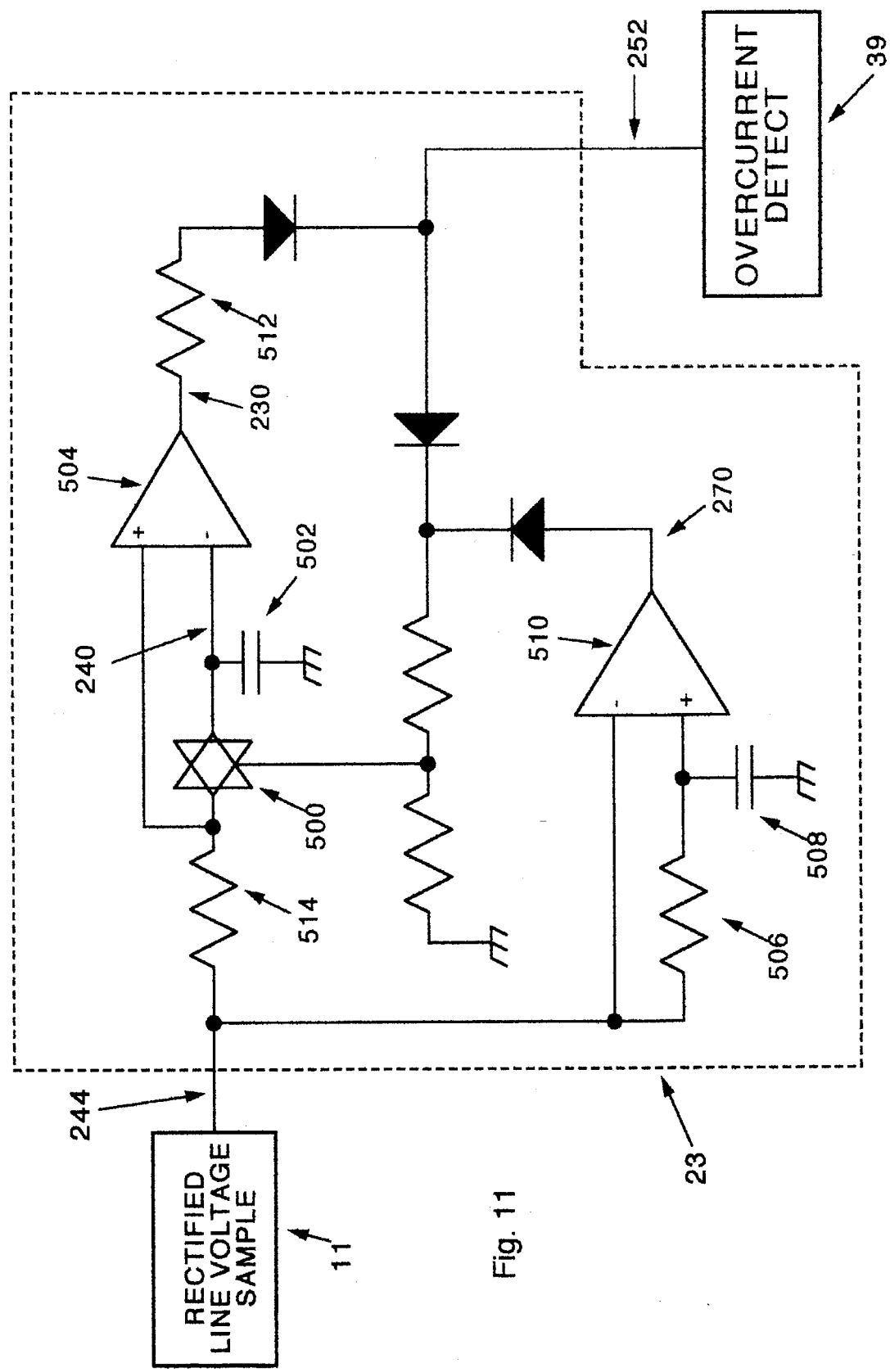
FIG. 11 is a circuit schematic of a track/hold current restart section.
Figure 12:
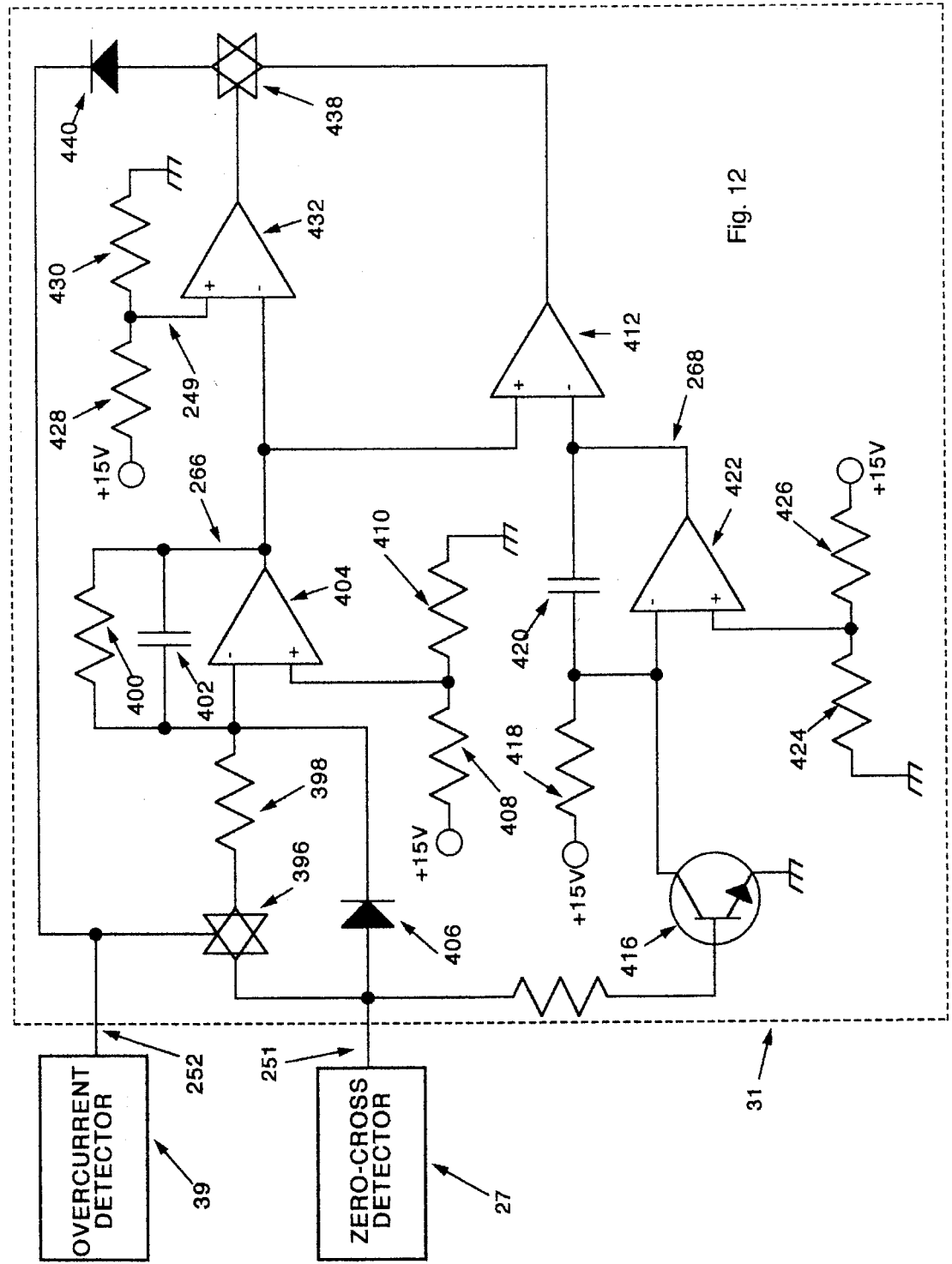
FIG. 12 is a circuit schematic of a zero-cross-based current restart section.

In reverse phase control (FIGS. 5A and 5B), the load current 124 is switched on at or near the zero-cross point 146, and thus starts very low and increases as the instantaneous line voltage 122 increases. Power 126 is delivered until the necessary phase angle 140 for the desired output voltage. If a large, cold incandescent load is present, overcurrent occurs when the load current 134 rises to a threshold level 136, a fairly long time after current begins to flow. The current is shut off at this time, rather than continuing as its projected load current 135, but enough power 138 is delivered to the load to warm it significantly, which will reduce the current required for the next half-cycle.

However, in forward phase control, as illustrated in FIGS. 6A and 6B, the load current is often switched on at time 140, while the instantaneous line voltage 122 is already relatively high. If a large, cold incandescent load is present which would cause a large load current 135 to flow, overcurrent occurs when the load current 150 rises to a threshold level 170, a very short time after current begins to flow. The current cutoff at this time results in a low duty cycle and little output power 155. In this condition, lamp filaments will not warm up quickly, and a long time will elapse until the lamp warms enough for normal operation. If the load is near the dimmer's maximum rating, and the current switch-on time is near the line voltage maximum, the filaments may never get warm enough to allow the lamp to light as desired.

Figure 14:
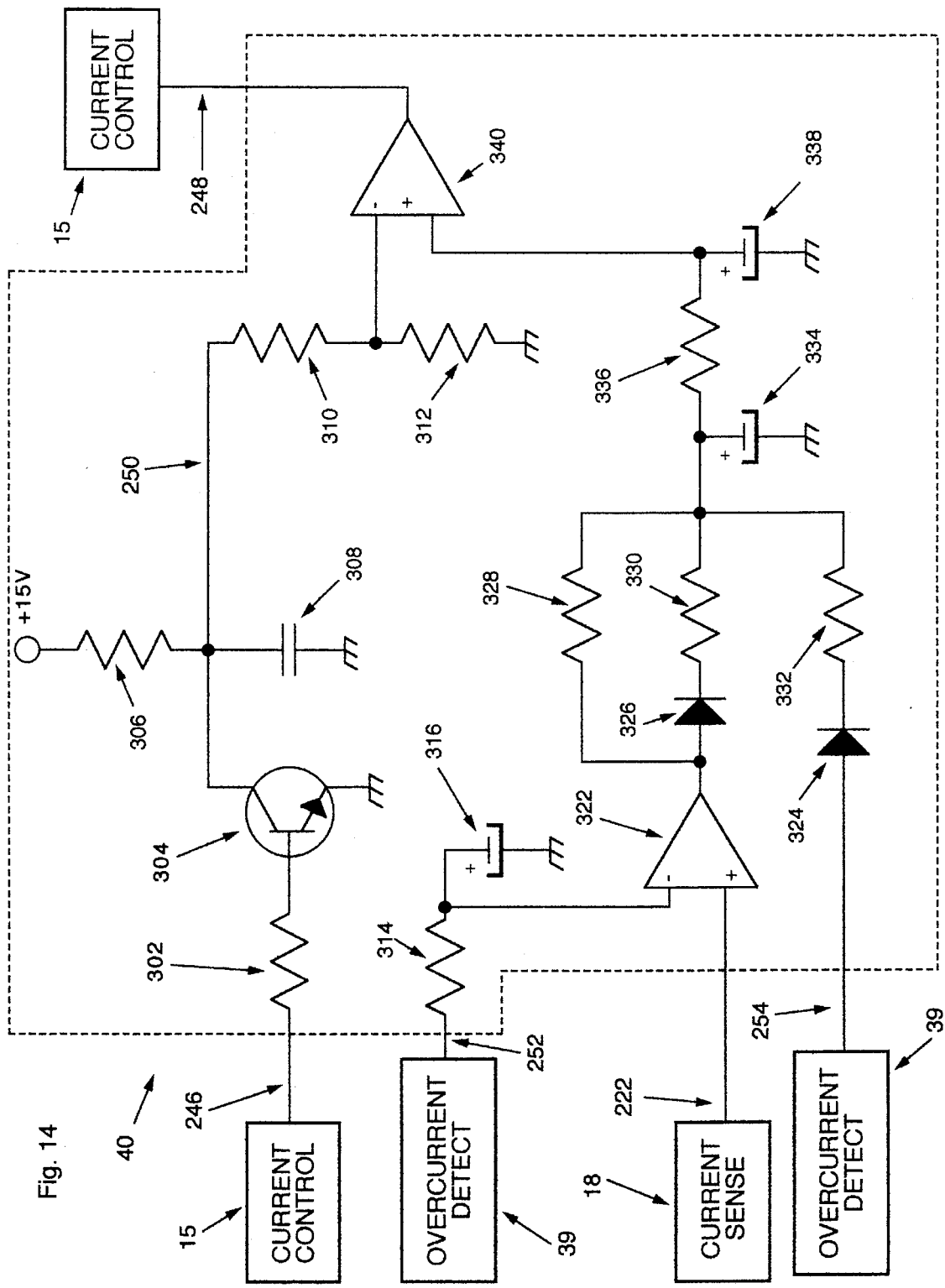
FIG. 14 is a circuit schematic of a switch-on time delay section.
Figure 15:
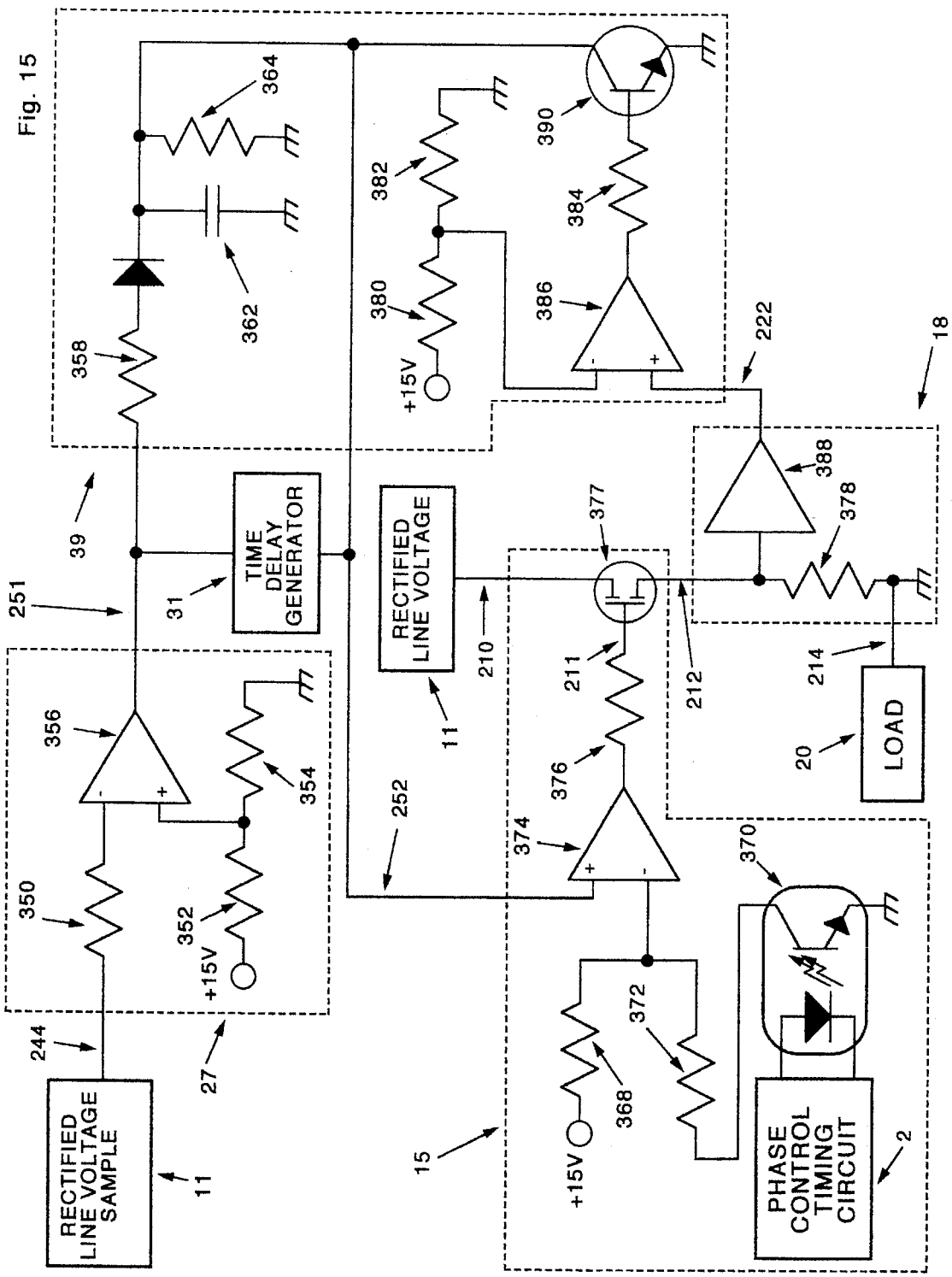
FIG. 15 is a circuit schematic of a current control section.
Figure 16:
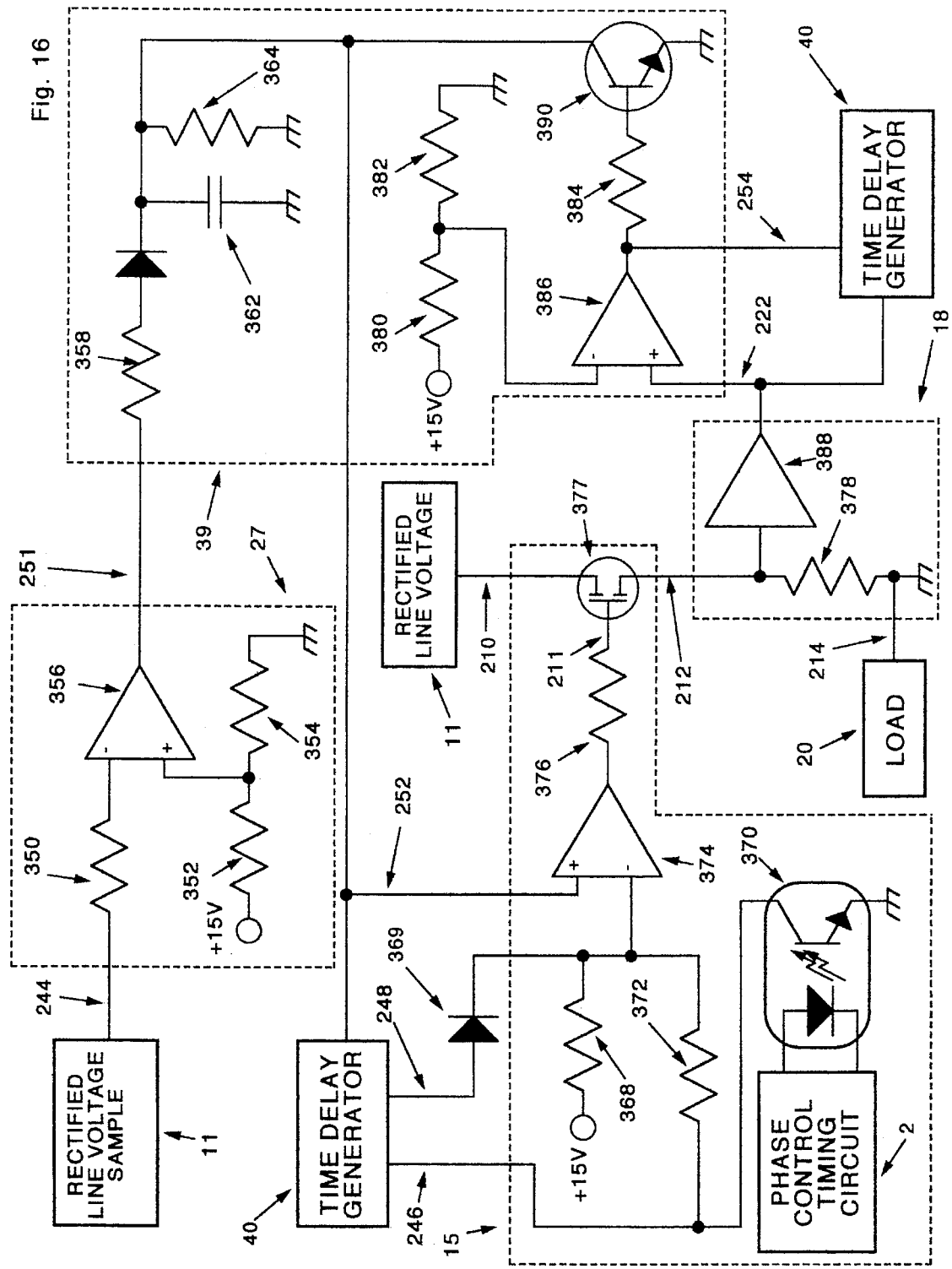
FIG. 16 is a circuit schematic of a current control section with connections to a switch-on time delay section.
Figure 23:
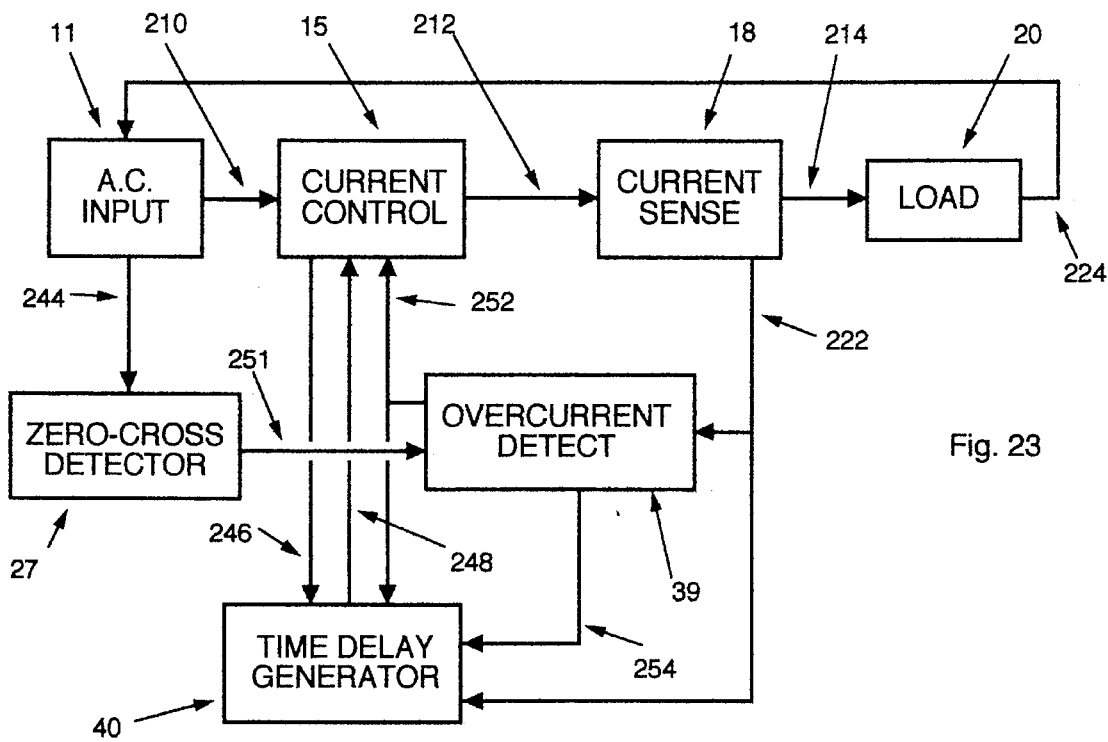
FIG. 23 is a block diagram of an embodiment with a switch-on time delay for forward phase control.

The embodiment present invention shown in FIGS. 14, 16 and 23 delays the time of current switch-on when an overload occurs as shown in FIGS. 10A through 10E, so, after several power line cycles, the switch-on 151 has been delayed several milliseconds. The output power 156 is still small at this time. Several power line cycles later, the switch-on 152 has been further delayed until the current never reaches the cutoff threshold level 170. The output power 157 increases, and the lamp filament starts to warm up significantly so, after several more power line cycles, the current switch-on time 153 has advanced, and the output power 158 is still greater. The process continues until the switch-on time 154 is at the phase angle 140 (duty cycle) for the desired output power 159.

In FIGS. 14, 16 and 23, a full-wave rectified sample 244 of the power line voltage is compared to a threshold voltage in comparator 356 to yield a narrow, positive-going pulse when the line voltage is near zero. This pulse charges capacitor 362, and a small portion is drained off through resistor 364, which is much larger than resistor 358. In normal operation, this voltage 252 is a sawtooth of small amplitude with a maximum level slightly below the positive supply rail. This signal 252 is connected to the positive input of comparator 374.

Optocoupler 370 receives a signal from a phase control timing circuit. It is off when the dimmer should not conduct current, so the negative input of comparator 374 is higher than its positive input. The optocoupler 370 turns on when current should flow through the dimmer, pulling the negative input of comparator 374 below the voltage 252 on its positive input. This causes the output of comparator 374 to rise, turning on FET 377 and causing current to flow through the load 20.

The load current develops a voltage across resistor 378, which is amplified by buffer 388 and compared to a threshold voltage in comparator 386. If the instantaneous current exceeds the threshold value, transistor 390 switches on and discharges capacitor 362. When the voltage 252 drops below the voltage on the negative input of comparator 374, the comparator output drops and turns off FET 377, which stops the 10ad current. The load current stays off until the next zero-crossing, when capacitor 362 is charged up again. If the overload is repeated, the signal 252 resembles a rectangular wave, with its duty cycle proportional to the length of time between the line voltage zero-cross and the overcurrent trip. This signal 252 is averaged by resistor 314 and capacitor 316 to develop a threshold voltage at the negative input of comparator 322 which decreases with prolonged or more severe load overcurrents.

The current signal 222 is corrected to the positive input of comparator 322, so, as the voltage on capacitor 316 decreases with overload, the output of comparator 322 will rise at lower current levels when the voltage at the output of comparator 322 rises, this raises the voltage in the filter network culminating at capacitor 338, which is connected to the positive input of comparator 340. The negative input of comparator 340 is connected to a ramp voltage 250, which is held near zero volts until the timing card causes optocoupler 370 to turn on and switches off transistor 304. Capacitor 308 charges up through resistor 306, producing a signal at the negative input of comparator 340, which rises as the length of time after the timing card signal increases. As long as this voltage is lower than the voltage on capacitor 338, the output of comparator 340 is high. This signal 248 is fed through diode 369 and overrides the phase control signal from optocoupler 370, preventing the voltage on the negative input of comparator 374 from dropping below its positive input, thus preventing load current flow the higher the voltage on capacitor 338, the longer the time delay between the phase control timing signal and the start of current flow. The values of the components 328, 330, 332, 334, 336 and 338 in the filter network are chosen to give a smooth increase and decrease in the delay time so the output voltage does not jump rapidly in response to, or recovery from, an overcurrent event. It should be noted that the current restart techniques described above can also be applied to this forward phase-control circuit, but these embodiments are not shown because of their repetitive nature.

Although the embodiments described above are essentially analog in nature, it is within the scope of the invention to use digital circuitry or microprocessors to replace many of the analog subsections, especially for time delay and logic-type operations. Threshold-voltage-setting resistor networks and comparators can convert analog voltages into logic values for further processing. This type of hybrid analog/digital operation lends itself very well to the use of low-cost microprocessors to perform complex operations. It also retains the speed of analog response without the need for continually performing A/D conversions to detect overcurrent conditions. Such A/D converters alone, with conversion times fast enough to be useful for continually performing overcurrent detection and FET transition detection, could cost much more than the processor utilized for the system of the invention.

Figure 17:
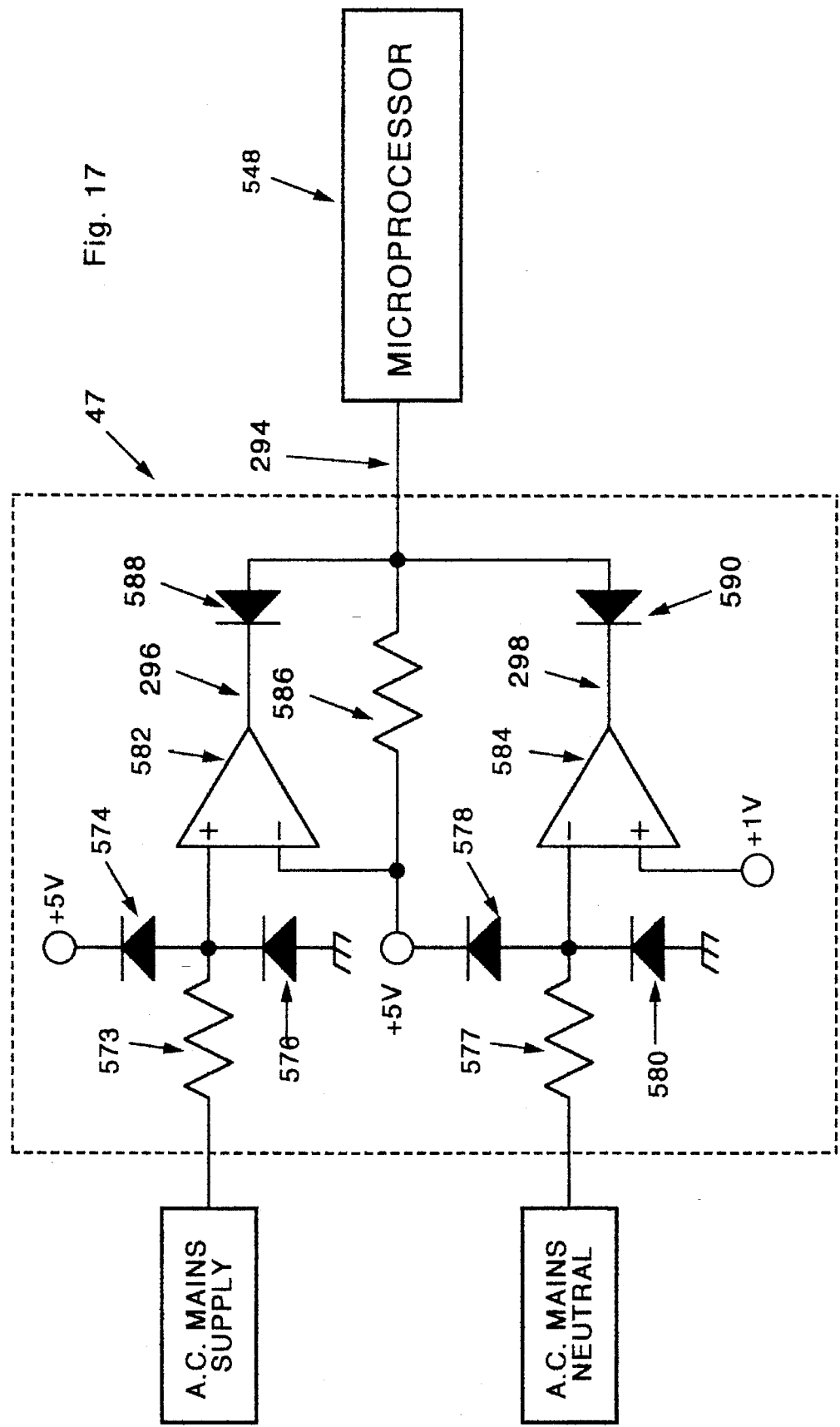
FIG. 17 is a circuit schematic of a FET transition detection section.

FIG. 17 shows a circuit for FET 377 transition detection which relies on the fact that the circuit common (or "round" at the anodes of diodes 576 and 580) changes its voltage relative to the mains power depending on whether the FET is off, on, or in transition. When the FET 377 is off, the load pulls the circuit common close to mains neutral. When the FET 377 is on, it pulls the circuit common close to mains hot, and during transition, the circuit common voltage is changing, depending on the relative resistances of the load and the FET 377. The circuit shown operates only on the positive polarity of the mains voltage, when the AC supply is more positive than neutral, which is sufficient for accurate measurements because, if the FET 377 is controlled the same way for both half-cycles, its transition time will be very similar for both half-cycles.

Diodes 574, 576, 578 and 580, and resistors 573 and 577 prevent the voltages at the inputs of comparator 582 and 584 from becoming positive or negative enough to cause damage to the comparators. When the FET is fully on, the circuit common is within several volts of the AC supply, and the positive input of comparator 582 will be lower than its negative input, so its output 296 will be low. When the FET is in transition or fully off, the circuit common voltage will be substantially lower than the AC supply, so the positive input of comparator 582 will be higher than its negative input, causing its output 296 to be high.

When the FET is fully on or in transition, the circuit common voltage is substantially higher than neutral, so the negative input of comparator 584 is lower than its positive input, so its output 298 is high. When the FET is off, the circuit common voltage is pulled close to AC neutral by the load. The negative input of comparator 584 is biased about 1 volt above circuit common, so the output 296 is low. The outputs of comparators 582 and 584 are thus both high only during a transition of the FET between fully on and fully off, and resistor 586 and diodes 588 and 590 provide a logic high to the microprocessor controller 548 during such transitions. The width of this pulse can easily be measured by a program loop or a timer within the processor, so the transition time can be measured by very low-cost means.

Figure 18:
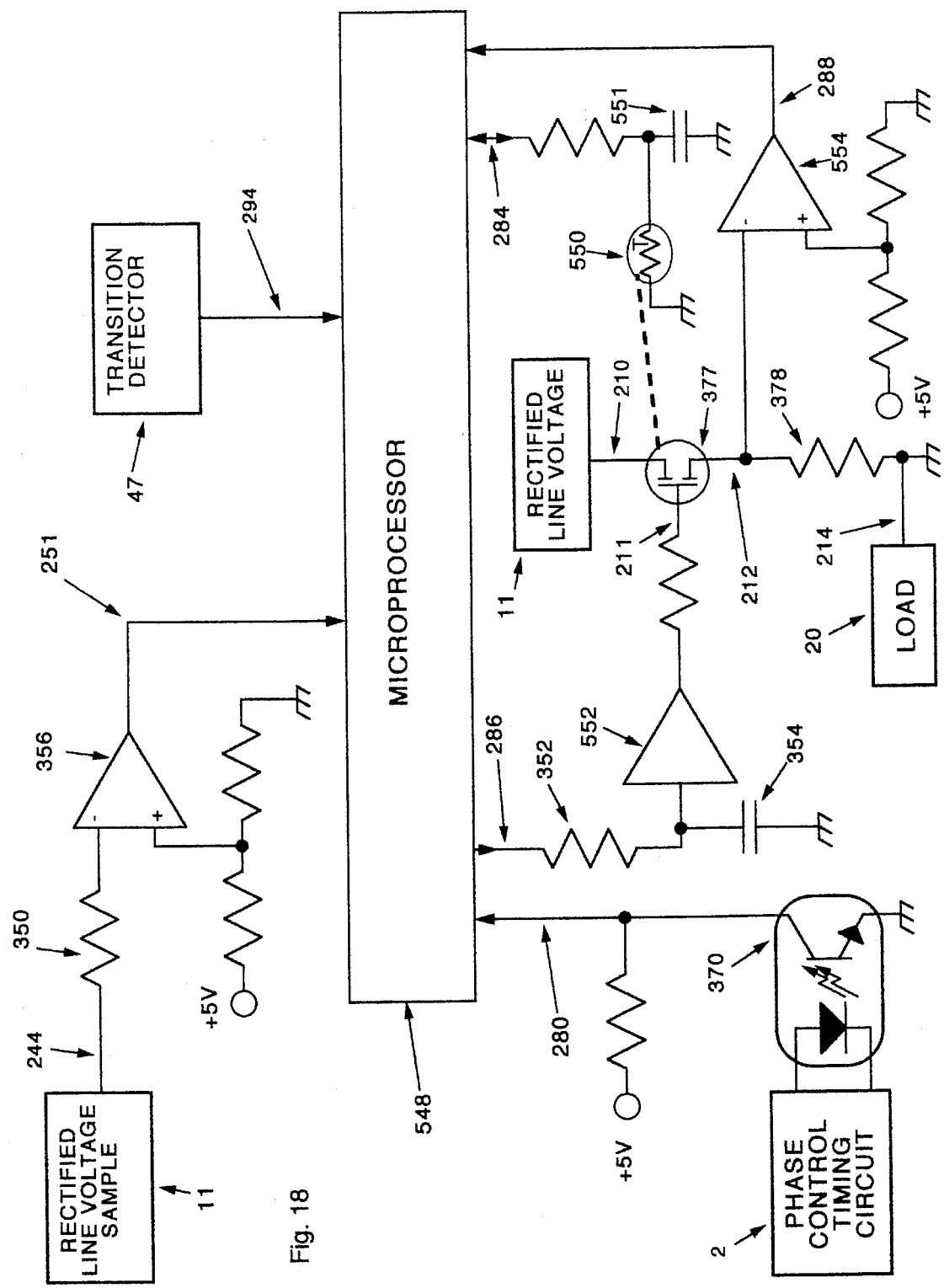
FIG. 18 is a circuit schematic of an embodiment with a microprocessor as the main control element.

FIG. 18 shows a microprocessor-based dimmer in which the processor 548 reads its input ports for zero-cross timing-port 251, phase-control timing-port 280, FET transition-port 294, and FET temperature-port 284 from a thermistor 550 thermally coupled to current control FET 377. The resistance of the thermistor is read by holding port 284 high until capacitor 551 is fully charged, then changing port 284 to an input. The voltage on capacitor 551 will discharge through thermistor 550, and the time required for port 284 to change from a logic high to a logic low can be converted into thermistor resistance and thus its temperature. The voltage level at which port 284 switches between logic states is calibrated during the dimmer's power-up initialization with a series of timed charges and discharges of capacitor 551. The processor 548 turns FET 377 on and off with output port 286, which is raised to the voltage level needed for full FET conduction by amplifier 552. The FET control line at port 286 can be pulse-width modulated to obtain intermediate FET gate voltages for various transition times. The RC combination 352, 354 average the signal. If excessive load current flows, the voltage drop across current sense resistor 378 exceeds the threshold level of comparator 554, and overcurrent signal at port 288 changes from logic high to low. If this signal is connected to an interrupt-generating input of the processor, the overcurrent response will occur almost immediately, rather than waiting until the next time the overcurrent signal line is read.

Figure 19:
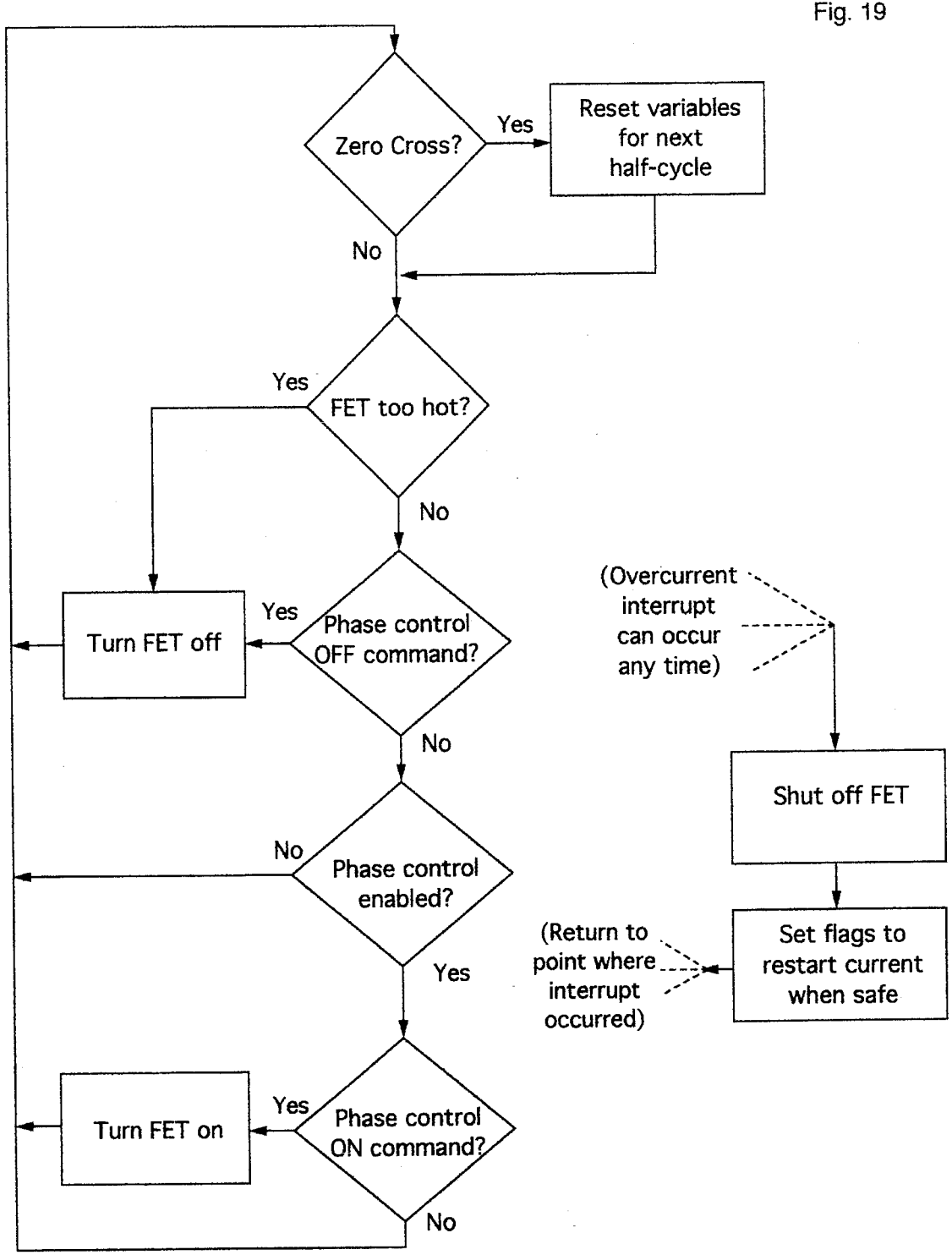
FIG. 19 is a flow chart of a sequential control loop with overcurrent interrupt.

FIG. 19 shows a main control loop for processor 548, with inputs read and actions taken in response in a sequential fashion. At the zero-cross time, the actions of the half-cycle being completed are finalized, and variables are initialized for the half-cycle being started. Temperature of the FET 377 does not need to be read on every pass through the control loop. Overcurrent response occurs within several microseconds of overcurrent detection through use of a processor interrupt. This type of control loop may be extended; however, the time required to complete the entire control loop can be long enough to cause noticeable step-wise changes in lamp brightness, unless the phase control input and FET transitions are also handled with interrupts, as shown in FIG. 18.

One problem which plagues both analog and digital circuitry, but is especially troublesome for microprocessor circuits, is power supply transients. Many microprocessors are designed to operate at 5 volts DC, with normal operation guaranteed over a relatively narrow voltage range. If the power supply voltage drops slightly below this normal operating point, or rises slowly when power is applied to the circuit, the microprocessor may operate incorrectly, scrambling its volatile memory or turning. outputs on or off unpredictably. It may even get "locked" into this condition, and not recover unless power is removed long enough to restart the processor completely. For a computing device which only deals with words or numbers, this problem may only cause loss of time and data, but with a high-power control circuit like a kilowatt dimmer, voltages and currents can develop which are damaging to the connected loads and the dimmer itself. Momentary power losses and mains supply "brownouts" can easily cause the processor power supply voltage to droop into this abnormal situation.

To prevent this problem, there are numerous commercially available microprocessor supervisory devices available. One of the functions such devices perform is forcing the microprocessor into a safe, defined "reset" state when the power supply voltage drops below a threshold level.

Figure 20:
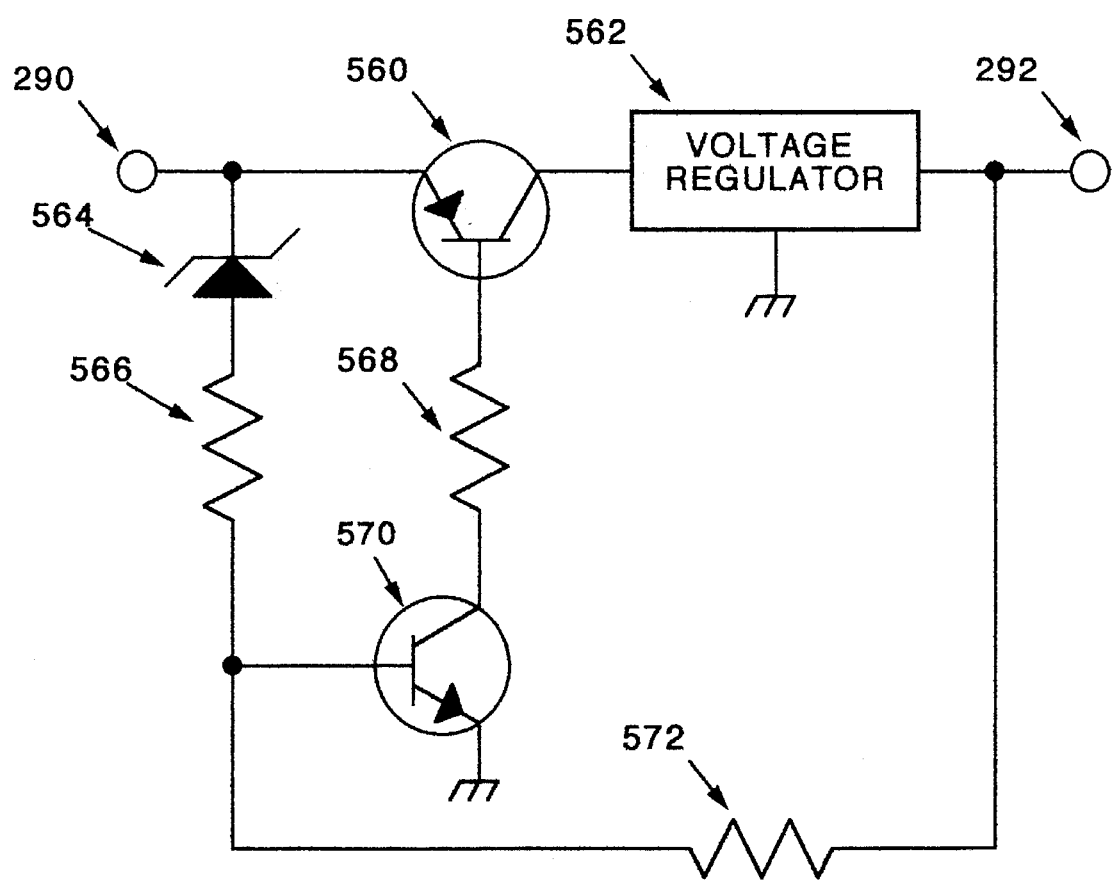
FIG. 20 is a circuit schematic of a microprocessor power supply.

A different approach, shown in FIG. 20, is to keep the processor power supply completely off until the unregulated input power is well above the voltage needed to develop the regulated processor power supply voltage, and to switch off the processor power supply when its voltage starts to drop, at a threshold well above the guaranteed minimum normal operating voltage of the processor. In FIG. 20, unregulated input power 290 is connected to the emitter of transistor 560, which remains off until the input voltage rises enough above the zener voltage of diode 564 to start turning on transistor 570 through the resistive divider 566 and 572. This starts to turn on transistor 560, supplying some voltage to the input of regulator 562. The output of regulator 562 starts to rise, and resistor 572 feeds back this voltage rise to turn on transistor 570 harder.

This positive feedback results in a very fast rise in the regulated power supply voltage 292 for the processor. When the unregulated input voltage 290 drops below the zener voltage, resistor 566 stops supplying current to the base of transistor 570, and resistor 572 has too much resistance to supply sufficient current to the base of transistor 570 to keep it in saturation, so transistor 570 starts to turn off, which starts to turn off transistor 560. This takes transistor 560 out of saturation, which reduces the voltage at the input of regulator 562, so the output voltage 292 of regulator 562 starts to drop. This reduces the current through resistor 572, turning transistor 570 off more. This switches off the regulated processor power supply voltage very quickly when it drops close to the minimum level required for guaranteed normal processor operation.

Figure 21A:
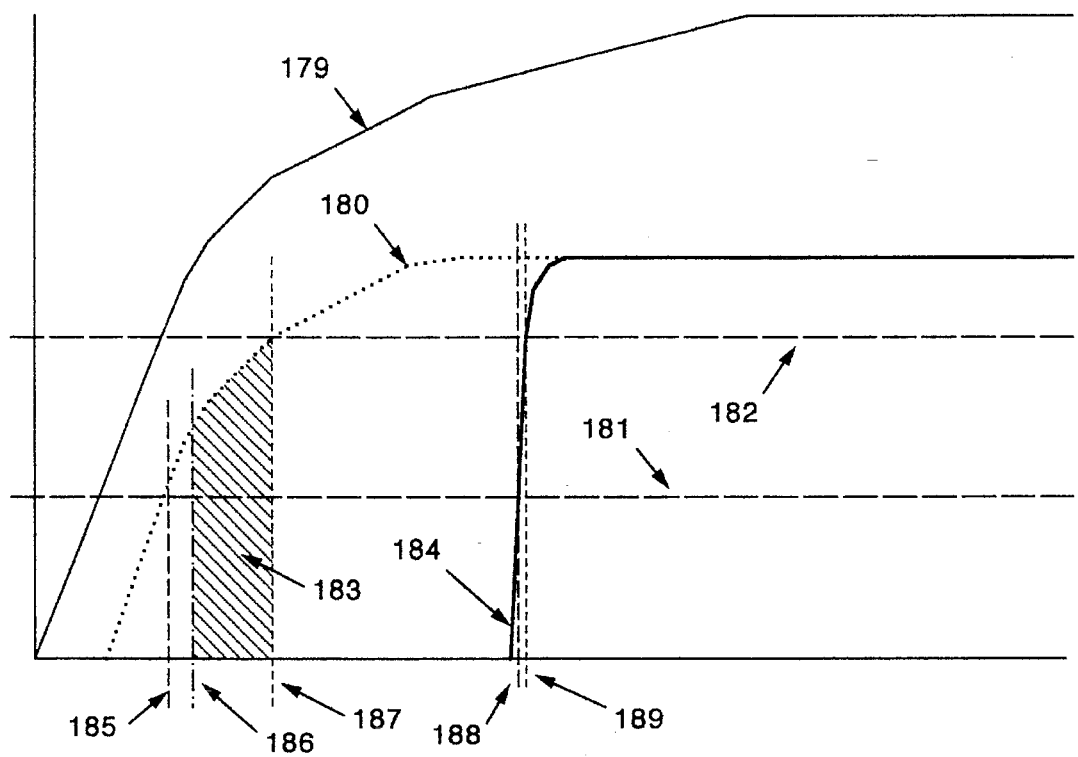
FIG. 21A and 21B illustrate a pair of waveform diagrams showing operation of the microprocessor power supply of FIG. 20.
Figure 21B:
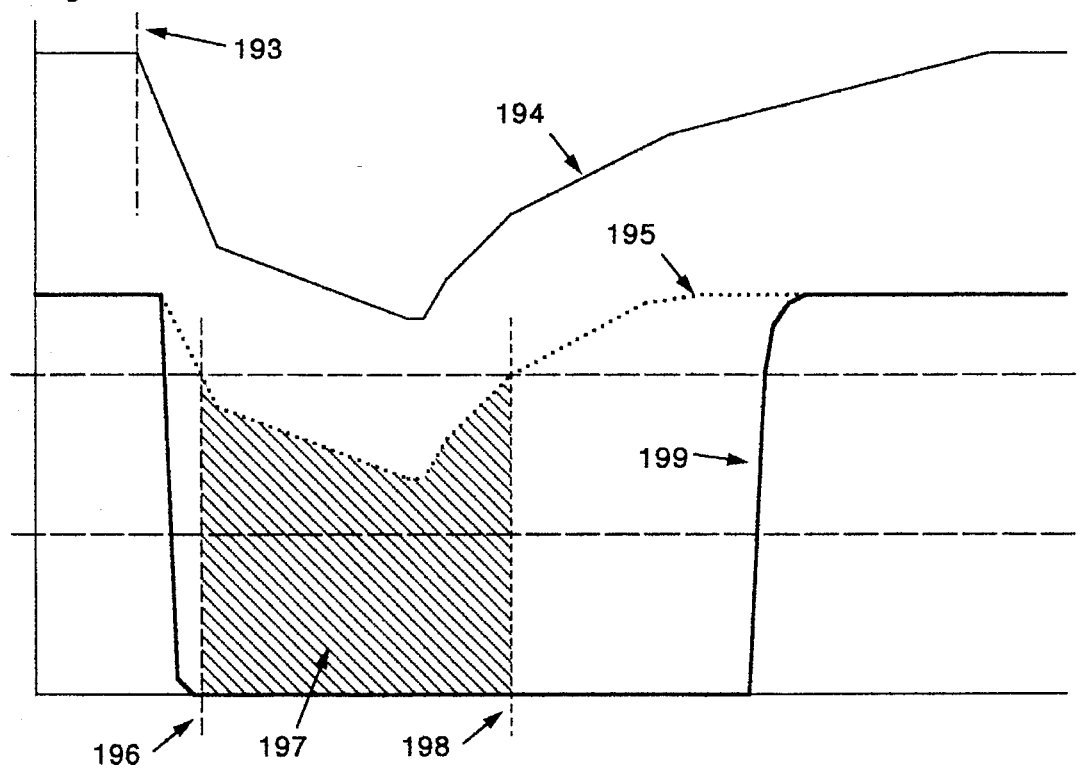
Figure 22:
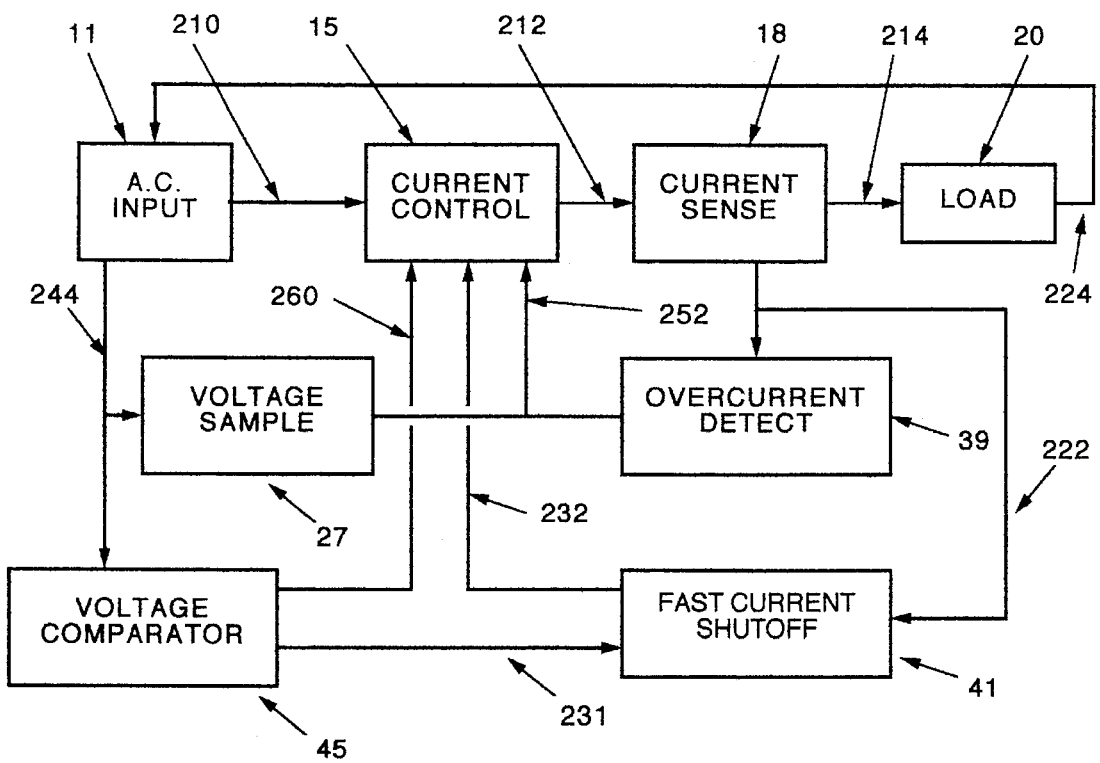
FIG. 22 is a block diagram of an embodiment with fast current shutoff for extreme overcurrents and current restart before the end of the half-cycle in which the overcurrent occurred.

The operation of this circuit for preventing abnormal operation of the processor due to insufficient supply voltage is shown in FIGS. 21A and 21B. When input power 179 is applied during startup, the prior art processor power supply voltage 180 starts to rise a short time later. When the processor voltage 180 reaches the minimum operating threshold of the processor 181 at time 185, the processor can start. After a short time delay while the processor oscillator starts at time 186, the processor may start to execute instructions, even though sections of the processor are not yet fully active. During the time interval 183 until the guaranteed normal operating voltage 182 is reached at time 187, unpredictable operations may take place. The new circuit keeps the processor power 184 at output 292 turned off until the input power is well above the level needed for well-regulated processor operation. The time between reaching minimum operating voltage 188 and guaranteed normal operation 189 is shorter than the startup time of the processor, so no instructions are executed until the processor power supply is within its normal operating range.

If a momentary power interruption occurs at time 193, the input power supply voltage 194 droops below that needed for the processor power supply to produce full normal voltage. In a typical prior art power supply, the processor supply voltage 195 would fall below the guaranteed operating point 182 at time 196, and carry out unpredictable operations during the time interval 197 before voltage 195 rose above the minimum normal operating level 182 at time 198. In contrast, the circuit of FIG. 20 would shut off processor power quickly before abnormal operation could start, and hold processor voltage 199 off until the input power supply was well above the minimum required level for normal processor operation.

The regulated processor power supply voltage is also used as a reference for threshold levels such as current limiting 288, temperature 284, and zero-crossing 251. By ensuring that the voltage reference is fully on or fully off, this circuit prevents operation with invalid threshold measurements. The voltage regulator 562 shown is a simple 3-terminal device readily available for many different voltage and current outputs. A regulator with an on/off control input could also be used with this type of positive feedback, in which case the pass transistor 260 would not be needed.

While particular embodiments of the invention have been shown and described in detail, it will be obvious to those skilled in the art that changes and modifications of the present invention, in its various aspects, may be made without departing from the invention in its broader aspect, some of which changes and modifications being matters of routine engineering or design, and other being apparent only after study. As such, the scope of the invention should not be limited by the particular embodiments and specific constructions described herein but should be defined by the appended claims and equivalents thereof. Accordingly, the aim in the appended claims is to cover all such changes and modifications as fall within the true spirit and scope of the invention.

The invention is claimed as follows:

1. An electronic power control circuit for controlling electrical power delivered from an alternating current source to a load, said electronic power control circuit comprising:

power controlling means operatively coupled to control electrical power delivered to a load, said power controlling means being operative in an on condition, for delivering electrical power to a load and operative in an off condition for withholding electrical power from a load; overcurrent detector circuit means for producing an overcurrent signal in response to an overcurrent condition at a load; and restart circuit means coupled to said power controlling means and to said overcurrent detector circuit means, and responsive to said overcurrent signal for causing said power controlling means to operate in said off condition, said restart circuit means being further operative for causing said power controlling means to return to said on condition before the end of the same alternating current half-cycle in which said overcurrent signal is produced.

2. A circuit in accordance with claim 1, wherein said restart circuit means includes a microprocessor having an interrupt-generating input coupled to said overcurrent detector means for producing a microprocessor interrupt in response to said overcurrent signal.

3. A circuit in accordance with claim 1, wherein said restart circuit means includes time delay circuit means for producing a restart signal after a predetermined time delay following said overload signal, said power controlling means being responsive to said restart signal for returning to said on state; said time delay circuit means being responsive to the time elapsed in the half-cycle before and after the overcurrent signal in such a manner that at the time of said restart signal the instantaneous voltage value of said alternating current source is lower than when the overcurrent signal occurred.

4. A circuit in accordance with claim 3, wherein said restart circuit means further includes zero-cross detector circuit means coupled to said time delay circuit means and to said alternating current source for producing a zero-cross signal at the beginning of each half-cycle of said alternating current source, said time delay circuit being responsive to said zero-cross signal and said overcurrent signal for measuring the elapsed time therebetween and for delaying said restart signal for a time inversely proportional to said elapsed time, such that the restart signal is produced at a time when the time remaining in the half-cycle is less than said elapsed time.

5. A circuit in accordance with claim 1, wherein said restart circuit means includes voltage responsive circuit means responsive to the instantaneous voltage value of said alternating current source being below a predetermined value for producing a restart signal, said power controlling means being responsive to said restart signal for returning to said conductive state.

6. A circuit in accordance with claim 5, wherein said restart circuit means further includes track and hold circuit means coupled with said voltage responsive circuit means for tracking the instantaneous voltage of said alternating current source and responsive to said overcurrent signal for holding the instantaneous voltage at which said overcurrent signal is produced and wherein said voltage responsive circuit means comprises voltage comparator circuit means for comparing the voltage held by said track and hold circuit means to the instantaneous voltage of said alternating current source, said held voltage comprising said predetermined value.

7. A circuit in accordance with claim 5, wherein said predetermined value comprises the value of the instantaneous voltage of said alternating current source at which said overcurrent signal was produced.

8. A circuit in accordance with claim 5, wherein said predetermined value comprises a voltage selected such that no overcurrent can flow.

9. A circuit in accordance with claim 8, wherein said voltage responsive circuit means comprises voltage comparator circuit means for comparing the instantaneous voltage of said alternating current source to said selected voltage.

10. A circuit in accordance with claim 8, and further including fast current shutoff circuit means coupled with said overcurrent detector circuit means and with said power controlling circuit means and responsive to said overload signal for causing said power controlling circuit means to shut off the load current very rapidly.

11. A circuit in accordance with claim 10, and further including threshold adjustment circuit means coupled with said overcurrent detector circuit means for selecting a threshold current value at which said overcurrent signal is produced.

12. A circuit in accordance with claim 10, and further including timer circuit means coupled with said overcurrent detector circuit means and said power controlling circuit means and responsive to repeated occurrences of said overcurrent signal for causing said power controlling circuit means to withhold current from the load for a predetermined length of time.

13. A forward phase control method for controlling the electrical power delivered by an alternating current source to loads, said method comprising: detecting an overcurrent condition at the load; causing electrical power to be withheld from the load in response to detection of said overcurrent condition; changing the timing of the start of delivery of electrical power to the load in alternating current half-cycles subsequent to the alternating current half-cycle during which an overcurrent was detected to times of lower instantaneous line voltage until no overcurrent condition is detected, and thereafter changing the timing of the start of delivery of electrical power to the load in subsequent alternating current half-cycles to times of higher instantaneous line voltage at which no overcurrent is detected until the phase control timing returns to a duty cycle corresponding to a desired output power.

14. An electronic power control circuit for controlling electrical power delivered from an alternating current source to a load, said electronic power control circuit comprising: power controlling means operatively coupled to control electrical power delivered to a load, said power controlling means being operative in an on condition for delivering electrical power to a load and operative in an off condition for withholding electrical power from a load; overcurrent detector circuit means for producing an overcurrent signal in response to an overcurrent condition at a load; current shutoff circuit means responsive to said overcurrent signal for causing said power controlling means to switch to said off condition; and phase control timing circuit means responsive to said overcurrent signal for changing the timing of the switching to said power controlling means to said on condition in alternating current half-cycles subsequent to the alternating current half-cycle during which an overcurrent was detected to times of lower instantaneous line voltage until no overcurrent is detected, and thereafter for changing the timing of the switching of said power controlling means to the on condition in subsequent alternating current half-cycles to times of higher instantaneous line voltage at which no overcurrent is detected until the timing of the start of the on condition of said power controlling means returns to a duty cycle corresponding to a desired output power.

15. A circuit in accordance with claim 14, wherein said phase control timing circuit means includes a microprocessor having an interrupt-generating input responsive to said overcurrent detector means for producing a microprocessor interrupt upon the occurrence of an overcurrent condition.

16. An electronic power control circuit for controlling electrical power delivered from an alternating current source to a load, said electronic power control circuit comprising: semiconductor power controlling means having a control input responsive to predetermined control signals for operating in an on condition for delivering electrical power to a load and for operating in an off condition for withholding electrical power from a load, respectively; a zero-crossing detector circuit for producing a zero-crossing signal in response to zero-crossings of said alternating current source; a phase control timing circuit for producing phase control signals in a predetermined fashion; a thermistor thermally coupled to said semiconductor power controlling means for producing a temperature signal corresponding to the temperature of said semiconductor power controlling means; load current sensor means for producing a load current signal corresponding to the current to the load; a microprocessor having a plurality of inputs including a first input coupled to receive said zero-crossing signal, a second input coupled to receive the phase control signals, a third input coupled to receive said temperature signal, and a fourth input coupled to receive said load current signal, said microprocessor being responsive to signals received at said plurality of inputs for developing said control signals for said semiconductor power controlling means in a predetermined fashion, and said microprocessor having a control output operatively coupled to said control input of said semiconductor power controlling means for delivering said control signals thereto.

17. A power control circuit according to claim 16, and further including a transition detection circuit for producing a transition signal in response to the transition of said semiconductor power controlling means between an on state and an off state and vice-versa, wherein said microprocessor has an additional input coupled to receive said transition signal.

18. An electronic power control circuit according to claim 17, and further including transition detection circuit means for detecting the transition of the semiconductor power controlling means between an on state and an off state, said transition detection circuit means comprising comparator circuit means for comparing the voltage on a circuit common to the instantaneous voltages on AC mains supply and AC mains neutral respectively and for producing a transition detection output signal when the voltage on the circuit common is substantially lower than the instantaneous voltage on the AC mains supply and substantially higher than the instantaneous voltage on the AC mains neutral.

19. A transition detection circuit for detecting the transition of a semiconductor between an on state and an off state, said transition detection circuit comprising comparator circuit means for comparing the voltage on a circuit common to the instantaneous voltages on AC mains supply and AC mains neutral respectively and for producing a transition detection output signal when the voltage on the circuit common is substantially lower than the instantaneous voltage on the AC mains supply and substantially higher than the instantaneous voltage on the AC mains neutral.

20. A power supply circuit for a microprocessor having a guaranteed minimum operating supply voltage, said power supply circuit comprising: a voltage regulator responsive to an input voltage above a predetermined minimum voltage for producing an output voltage above said guaranteed minimum operating supply voltage, and regulator switching circuit means coupled between said voltage regulator and a source of said input voltage and responsive to said input voltage for rapidly turning on said voltage regulator to rapidly reach said output voltage above said guaranteed minimum operating supply voltage when said input voltage goes above said predetermined minimum voltage and for rapidly turning off said voltage regulator when said input voltage falls below said predetermined minimum voltage.

* * * * *